US012010153B1

(12) United States Patent
Slotznick

(10) Patent No.: US 12,010,153 B1
(45) Date of Patent: *Jun. 11, 2024

(54) METHOD AND APPARATUS FOR DISPLAYING VIDEO FEEDS IN AN ONLINE MEETING USER INTERFACE IN A MANNER THAT VISUALLY DISTINGUISHES A FIRST SUBSET OF PARTICIPANTS FROM A SECOND SUBSET OF PARTICIPANTS

(71) Applicant: Benjamin Slotznick, Mt. Gretna, PA (US)

(72) Inventor: Benjamin Slotznick, Mt. Gretna, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,147

(22) Filed: Apr. 3, 2023

Related U.S. Application Data

(63) Continuation of application No. 17/942,635, filed on Sep. 12, 2022, now Pat. No. 11,621,979, which is a
(Continued)

(51) Int. Cl.
*H04L 65/1059* (2022.01)
*G06F 3/14* (2006.01)
(Continued)

(52) U.S. Cl.
CPC ........ *H04L 65/1059* (2013.01); *G06F 3/1454* (2013.01); *G06T 3/60* (2013.01); *H04L 65/403* (2013.01)

(58) Field of Classification Search
CPC ...... G06F 3/1454; G06F 3/147; G06F 16/957; G06Q 20/3224; G06T 3/60; G06V 40/176;
(Continued)

(56) References Cited

U.S. PATENT DOCUMENTS 8,330,791 B2  12/2012  Gorzynski et al.
8,629,895 B2   1/2014  Lee
(Continued)

OTHER PUBLICATIONS

"Custom Together Mode scenes in Teams." Downloaded from webpage: <https://docs.microsoft.com/en-us/microsoftteams/platform/apps-in-teams-meetings/teams-together-mode>, posted Nov. 18, 2021, 10 pages.
(Continued)

*Primary Examiner* — Gerald Gauthier
(74) *Attorney, Agent, or Firm* — Panitch Schwarze Belisario & Nadel LLP

(57) ABSTRACT

A virtual space view is provided in an online meeting user interface associated with a videoconferencing system that is changeable by gestures of meeting participants. The virtual space view displays avatars or video feeds of the meeting participants on their respective participant computers. The videoconferencing system captures video feeds of all meeting participants, including meeting participants being displayed as avatars. Software of the videoconferencing system recognizes a specific gesture of a meeting participant. The specific gesture is associated with a predefined directional movement of the meeting participant's avatar or video feed within the virtual space view during the online meeting, and the predefined directional movement is requested by the meeting participant via the specific gesture. The specific gesture of the meeting participant is a physical body gesture of the meeting participant which is captured in the video feed of the meeting participant. The videoconferencing system automatically repositions the video feed of the meeting participant who made the specific gesture within the virtual space view during the online meeting in accordance with the associated predefined directional movement.

16 Claims, 17 Drawing Sheets

Related U.S. Application Data continuation-in-part of application No. 17/737,201, filed on May 5, 2022, now Pat. No. 11,444,982, which is a continuation of application No. 17/565,729, filed on Dec. 30, 2021, now Pat. No. 11,330,021.

(60) Provisional application No. 63/132,617, filed on Dec. 31, 2020.

(51) Int. Cl.
*G06T 3/60* (2006.01)
*H04L 65/403* (2022.01)

(58) Field of Classification Search
CPC ..... G09G 5/14; H04L 65/1059; H04L 65/403; H04L 65/764; H04N 7/15; H04N 7/152; H04N 7/157; H04N 21/478
USPC ........................ 345/594; 348/14.07
See application file for complete search history.

(56) References Cited

U.S. PATENT DOCUMENTS

| | | | |
|---|---|---|---|
| 9,197,853 B2 | 11/2015 | Shi et al. | |
| 9,756,297 B1 | 9/2017 | Clements | |
| 9,936,163 B1 | 4/2018 | Lubelsky et al. | |
| 9,942,519 B1 | 4/2018 | Pan et al. | |
| 10,218,588 B1 | 2/2019 | Brisebois et al. | |
| 10,264,214 B1 | 4/2019 | Kumar | |
| 10,475,246 B1 | 11/2019 | Gribetz et al. | |
| 10,491,785 B1 | 11/2019 | Arnot | |
| 10,965,883 B2 | 3/2021 | Jaynes | |
| 10,972,295 B1 | 4/2021 | van Rensburg | |
| 11,056,014 B1 | 7/2021 | Chasen et al. | |
| 11,082,661 B1 | 8/2021 | Pollefeys | |
| 11,170,465 B1* | 11/2021 | Feimster | H04L 65/403 |
| 11,228,625 B1* | 1/2022 | Libin | G06V 40/176 |
| 11,245,871 B1 | 2/2022 | Gandhi et al. | |
| 11,269,581 B2* | 3/2022 | Todasco | G06Q 20/3224 |
| 11,330,021 B1* | 5/2022 | Slotznick | H04L 65/403 |
| 11,343,293 B1 | 5/2022 | Slotznick | |
| 11,394,924 B1 | 7/2022 | Maxim | |
| 11,444,982 B1 | 9/2022 | Slotznick | |
| 11,451,746 B1* | 9/2022 | Graybill | G06T 7/11 |
| 11,490,119 B2 | 11/2022 | Wang et al. | |
| 2004/0252185 A1 | 12/2004 | Vernon et al. | |
| 2005/0188321 A1 | 8/2005 | Adams et al. | |
| 2007/0165106 A1 | 7/2007 | Groves et al. | |
| 2007/0211071 A1* | 9/2007 | Slotznick | G06F 16/957 |
| | | | 345/594 |
| 2008/0129816 A1 | 6/2008 | Mattila et al. | |
| 2010/0194961 A1 | 8/2010 | Patel | |
| 2011/0001760 A1 | 1/2011 | Meier | |
| 2011/0196928 A1 | 8/2011 | Pryhuber | |
| 2012/0311507 A1 | 12/2012 | Murrett et al. | |
| 2013/0055087 A1 | 2/2013 | Flint | |
| 2013/0070045 A1 | 3/2013 | Meek | |
| 2013/0093838 A1 | 4/2013 | Tan et al. | |
| 2013/0106985 A1 | 5/2013 | Tandon et al. | |
| 2013/0120521 A1* | 5/2013 | Cope | H04N 7/15 |
| | | | 348/14.07 |
| 2013/0242030 A1* | 9/2013 | Kato | H04N 21/478 |
| | | | 348/14.07 |
| 2013/0346913 A1 | 12/2013 | Smith | |
| 2014/0028685 A1 | 1/2014 | Weskamp et al. | |
| 2014/0047143 A1 | 2/2014 | Bateman et al. | |
| 2014/0063178 A1 | 3/2014 | Krans et al. | |
| 2014/0075535 A1 | 3/2014 | Soffer et al. | |
| 2014/0082522 A1 | 3/2014 | Gunderson et al. | |
| 2014/0108506 A1 | 4/2014 | Borzycki et al. | |
| 2014/0139613 A1 | 5/2014 | Anderson | |
| 2014/0192138 A1* | 7/2014 | Kenoyer | H04L 65/764 |
| | | | 348/14.07 |
| 2014/0225977 A1 | 8/2014 | Vilcovsky et al. | |
| 2014/0269930 A1 | 9/2014 | Robinson et al. | |
| 2014/0272908 A1 | 9/2014 | Black | |
| 2014/0337468 A1 | 11/2014 | Horikiri et al. | |
| 2015/0058753 A1 | 2/2015 | Anderson et al. | |
| 2015/0085061 A1* | 3/2015 | Sun | H04N 7/152 |
| | | | 348/14.07 |
| 2015/0089394 A1 | 3/2015 | Chen et al. | |
| 2015/0116448 A1 | 4/2015 | Gottlieb | |
| 2015/0123991 A1 | 5/2015 | Yarosh et al. | |
| 2015/0163454 A1 | 6/2015 | Smith et al. | |
| 2015/0172599 A1 | 6/2015 | Caldwell | |
| 2015/0213650 A1 | 7/2015 | Barzuza et al. | |
| 2015/0256764 A1 | 9/2015 | Besson | |
| 2015/0261934 A1 | 9/2015 | Miller | |
| 2015/0264316 A1 | 9/2015 | Sanaullah et al. | |
| 2015/0317835 A1 | 11/2015 | Byers | |
| 2015/0358581 A1 | 12/2015 | Zhou et al. | |
| 2015/0381932 A1* | 12/2015 | Louchheim | H04N 7/152 |
| | | | 348/14.07 |
| 2016/0050391 A1 | 2/2016 | Schultz et al. | |
| 2016/0073056 A1 | 3/2016 | Katzman et al. | |
| 2016/0092153 A1 | 3/2016 | DeMik et al. | |
| 2016/0094504 A1 | 3/2016 | Cinar et al. | |
| 2016/0127685 A1 | 5/2016 | Huang | |
| 2016/0127686 A1* | 5/2016 | Nagase | H04L 65/403 |
| | | | 348/14.07 |
| 2016/0150184 A1 | 5/2016 | Gandhi | |
| 2016/0227165 A1 | 8/2016 | Moorjani et al. | |
| 2016/0234442 A1 | 8/2016 | Pylkkanen | |
| 2016/0299672 A1 | 10/2016 | Lindenberg et al. | |
| 2016/0306420 A1 | 10/2016 | Hill, III | |
| 2016/0344780 A1 | 11/2016 | Kay et al. | |
| 2016/0353057 A1 | 12/2016 | Chung et al. | |
| 2017/0034160 A1 | 2/2017 | Brands et al. | |
| 2017/0147866 A1 | 5/2017 | Tokui et al. | |
| 2017/0187884 A1 | 6/2017 | Minor | |
| 2017/0237941 A1 | 8/2017 | Vats | |
| 2017/0365102 A1 | 12/2017 | Huston et al. | |
| 2018/0013981 A1 | 1/2018 | Spattini | |
| 2018/0052840 A1 | 2/2018 | Scott et al. | |
| 2018/0063480 A1 | 3/2018 | Luks et al. | |
| 2018/0259338 A1 | 9/2018 | Stokes et al. | |
| 2018/0278879 A1 | 9/2018 | Saban et al. | |
| 2018/0341374 A1 | 11/2018 | Faulkner et al. | |
| 2018/0375676 A1 | 12/2018 | Bader-Natal et al. | |
| 2019/0043221 A1 | 2/2019 | Torma | |
| 2019/0139543 A1 | 5/2019 | Rahmel et al. | |
| 2019/0230310 A1 | 7/2019 | Faulkner | |
| 2019/0266238 A1 | 8/2019 | Faulkner et al. | |
| 2019/0268569 A1 | 8/2019 | Takita et al. | |
| 2019/0372241 A1 | 12/2019 | Sharawi et al. | |
| 2020/0159035 A1 | 5/2020 | Haseltine et al. | |
| 2020/0201512 A1 | 6/2020 | Faulkner et al. | |
| 2020/0219216 A1 | 7/2020 | Davis et al. | |
| 2020/0228359 A1 | 7/2020 | el Kaliouby et al. | |
| 2020/0322306 A1 | 10/2020 | Serena | |
| 2020/0396264 A1 | 12/2020 | Koga et al. | |
| 2021/0005098 A1 | 1/2021 | Davis et al. | |
| 2021/0044779 A1 | 2/2021 | Prins et al. | |
| 2021/0076002 A1 | 3/2021 | Peters et al. | |
| 2021/0176429 A1 | 6/2021 | Peters et al. | |
| 2021/0185276 A1 | 6/2021 | Peters et al. | |
| 2021/0195141 A1 | 6/2021 | Eskafi et al. | |
| 2021/0218790 A1* | 7/2021 | Ringenberg | H04L 65/1059 |
| 2021/0241705 A1* | 8/2021 | Frederick | G09G 5/14 |
| 2021/0248821 A1* | 8/2021 | Wolfensparger | G06F 3/147 |
| 2021/0368136 A1 | 11/2021 | Chalmers et al. | |
| 2021/0377275 A1 | 12/2021 | Gronvik et al. | |
| 2021/0385263 A1 | 12/2021 | Churchill | |
| 2021/0399911 A1 | 12/2021 | Jorasch et al. | |
| 2021/0400142 A1 | 12/2021 | Jorasch et al. | |
| 2022/0014572 A1 | 1/2022 | Adams et al. | |
| 2022/0014580 A1 | 1/2022 | Shadfar et al. | |
| 2022/0014711 A1 | 1/2022 | Eskafi et al. | |
| 2022/0021680 A1 | 1/2022 | Roedel et al. | |
| 2022/0027115 A1* | 1/2022 | Haapoja | G09G 5/14 |
| 2022/0030042 A1 | 1/2022 | Roedel et al. | |
| 2022/0061643 A1* | 3/2022 | Duckett, III | G06T 3/60 |
| 2022/0078374 A1 | 3/2022 | Au | |
| 2022/0083307 A1* | 3/2022 | Tyurin | G06F 3/1454 |

(56) References Cited

U.S. PATENT DOCUMENTS

| | | | |
|---|---|---|---|
| 2022/0086203 A1* | 3/2022 | Morris | H04N 7/157 |
| 2022/0103784 A1 | 3/2022 | Pollefeys | |
| 2022/0116552 A1 | 4/2022 | Benjamin | |
| 2022/0174103 A1 | 6/2022 | Jeffery et al. | |
| 2022/0182581 A1* | 6/2022 | Oz | H04N 7/157 |

OTHER PUBLICATIONS

Todd Bishop, "Will your meeting suck less in a virtual auditorium? Microsoft unveils 'Together' mode for Teams." Downloaded from webpage: <https://www.geekwire.com/2020/will-meeting-suck-less-virtual-auditorium-microsoft-unveils-new-together-mode-teams/>, Geekwire.com, published Jul. 8, 2020, 3 pages.

Zoom Fully Customizable SDK, downloaded from webpage: <https://marketplace.zoom.us/docs/sdk/custom/introduction>, download date: Dec. 28, 2020, original posting date: unknown, 1 page.

Zoom OSC, Liminal Entertainment Technologies, downloaded from webpage: <https://www.liminalet.com/zoomosc>, download date: Dec. 28, 2020, original posting date: unknown, 2 pages.

Wikipedia entry for "Open Sound Control." Downloaded from webpage: <https://en.wikipedia.org/wiki/Open_Sound_Control>, page last edited on Oct. 26, 2020, 4 pages.

Pinning participants' videos—Zoom Help Center. Downloaded from webpage: <https://support.zoom.us/hc/en-us/articles/201362743-Pinning-participants-videos>, download date: Dec. 28, 2020, original posting date: unknown, 3 pages.

Susanna Ray, "Video fatigue and a late-night host with no audience inspire a new way to help people feel together, remotely." Downloaded from webpage: <https://news.microsoft.com/innovation-stories/microsoft-teams-together-mode/>, published Jul. 8, 2020, 8 pages.

Mary Branscombe, "Microsoft Teams: This new mode makes your video meetings less exhausting and more productive." Downloaded from webpage: <https://www.techrepublic.com/article/microsoft-teams-this-new-mode-makes-your-video-meetings-less-exhausting-and-more-productive/>, published Sep. 15, 2020, 15 pages.

Rabia Noureen, "Microsoft Teams meetings to get new Mirror my video feature this month." Downloaded from webpage: <https://www.onmsft.com/news/microsoft-teams-mirror-my-video-meetings>, published Nov. 12, 2021, 2 pages.

Hand Gestures—Lens Studio by Snap Inc. Downloaded from webpage: <https://lensstudio.snapchat.com/guides/general/hand gestures/> download date: Dec. 29, 2021, original posting date: unknown, 7 pages.

Full Body Triggers—Lens Studio by Snap Inc. Downloaded from webpage: <https://lensstudio.snapchat.com/templates/object/full-body-triggers/?utm_source=lensstudio> download date: Dec. 29, 2021, original posting date: unknown, 18 pages.

Touchless User Interface. Downloaded from webpage: https://www.banuba.com/solutions/touchless-user-interface, download date: Dec. 29, 2021, original posting date: unknown, 13 pages.

* cited by examiner

User viewing mirror image of webcam video

User viewing video of user as captured by webcam

User viewing nine video streams as captured by webcams

User viewing nine video streams, only the user's video stream is mirrored

Another person viewing video of nine video streams created as in Fig. 3A, but processed so all appear un-mirrored while preserving interpersonal relative focus of gestures.

User viewing nine video streams all individually mirrored

User viewing video of nine mirrored video streams, arranged so that when processed as in Fig. 3B, they will appear arranged as in Fig. 2A User in Fig. 3E viewing video streams from same nine individuals in Fig. 3E, but several moments later after the user and one other make different gestures.

Another user viewing video of nine mirrored video streams shown in Fig. 3C.

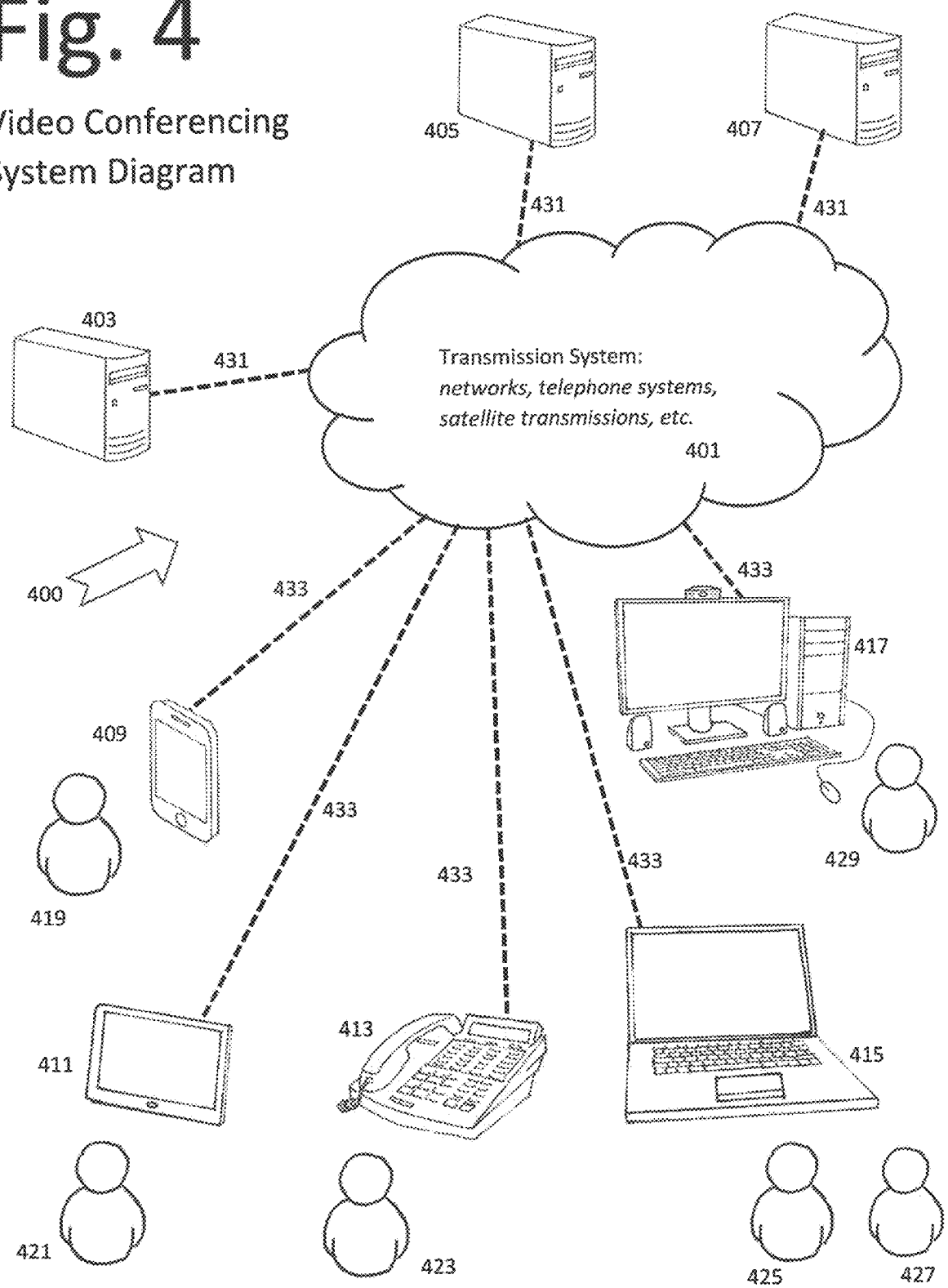

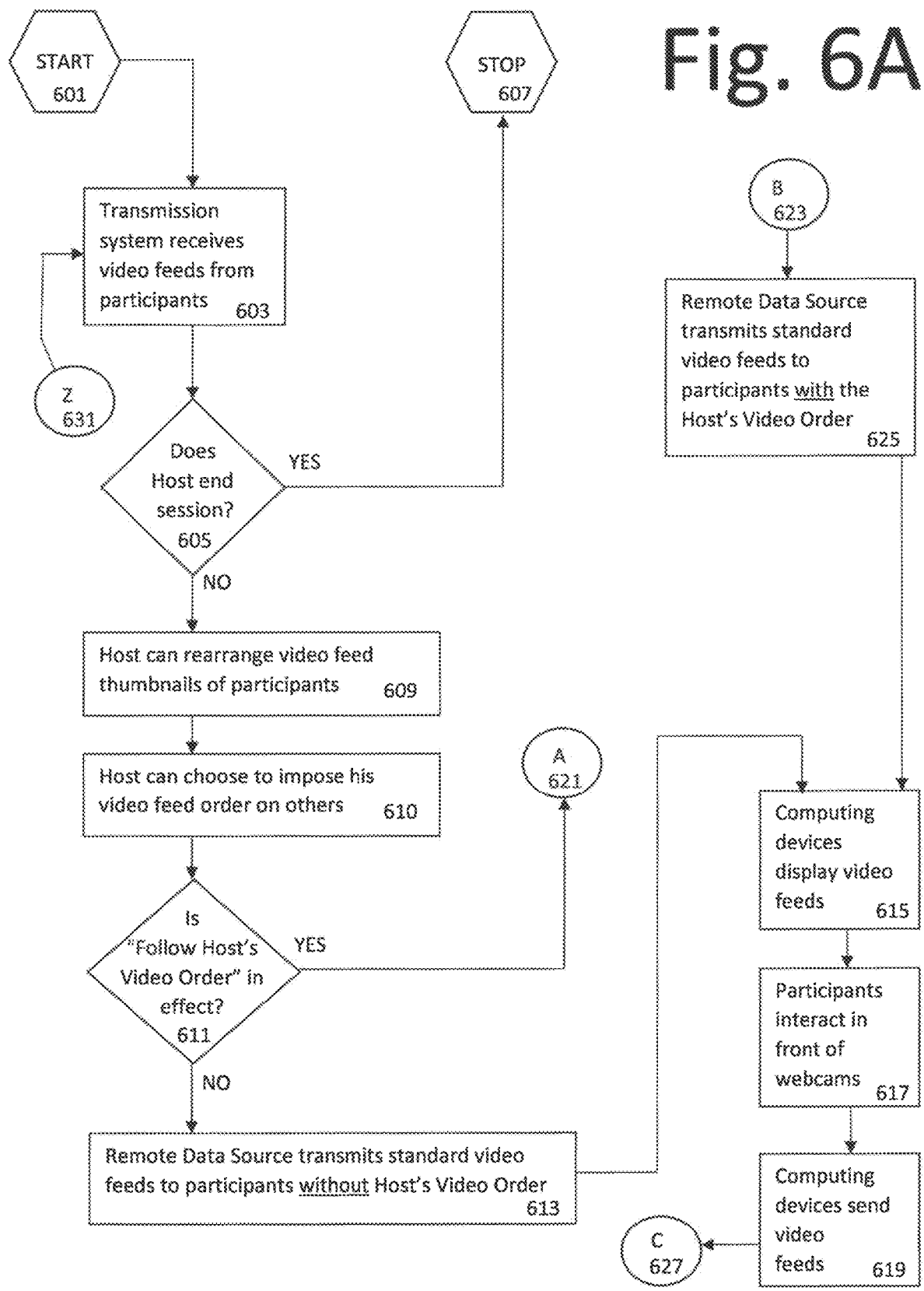

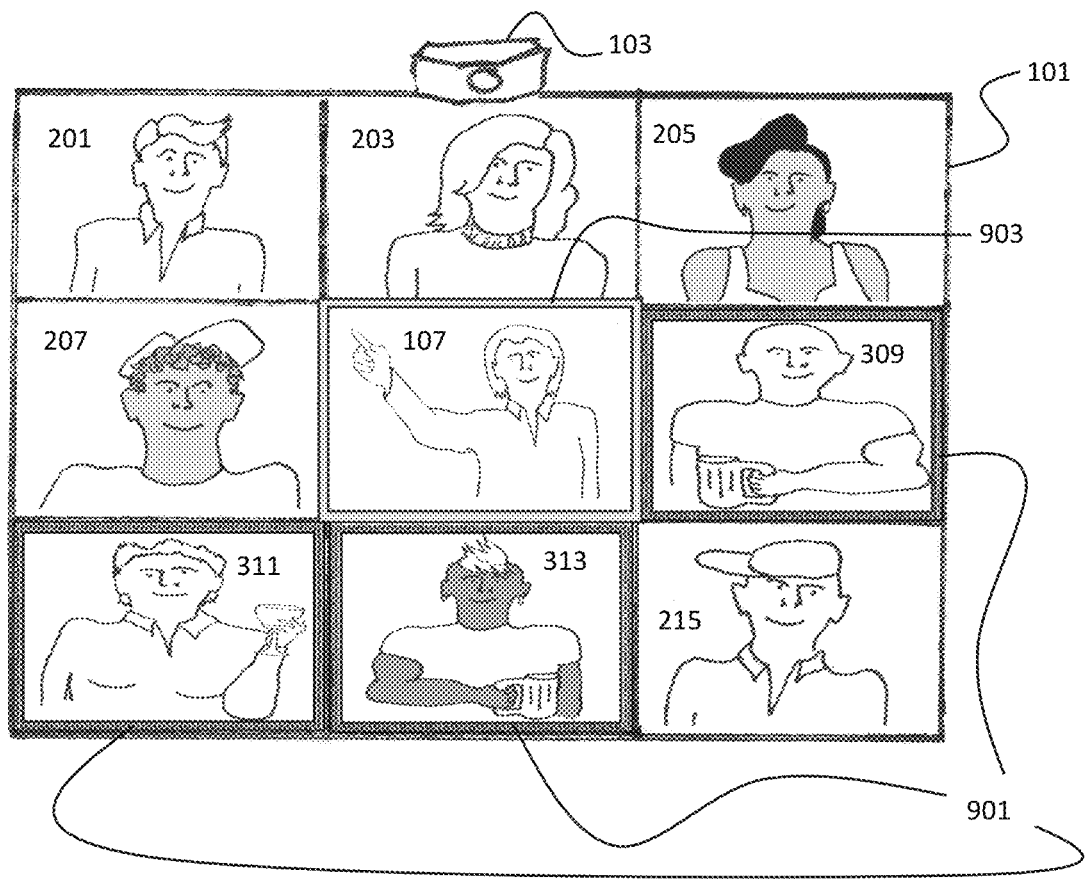
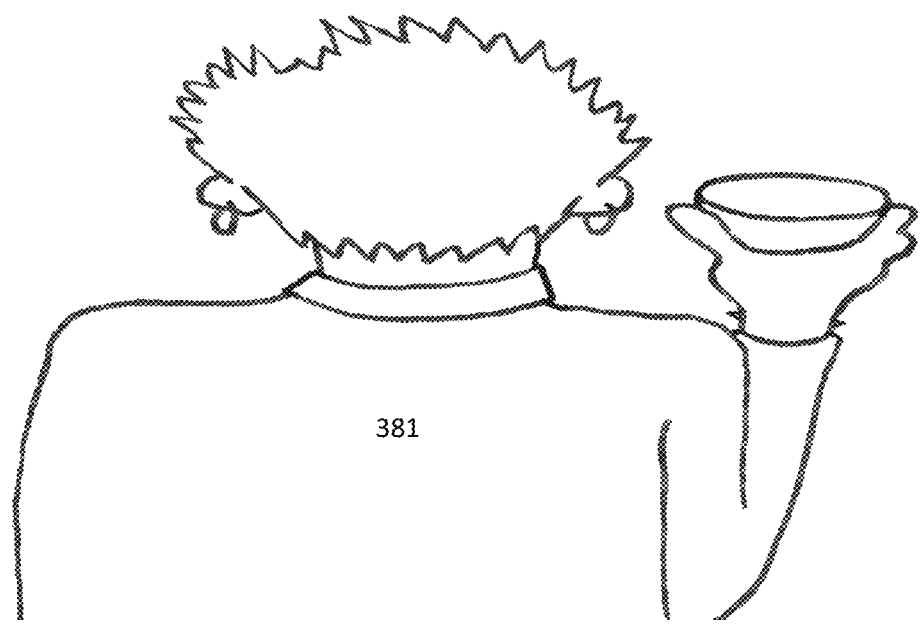
Fig. 9A — User viewing nine video streams, three of which (including the user) have chosen to show their streams to all as mirrored. A non-mirrored user is speaking.

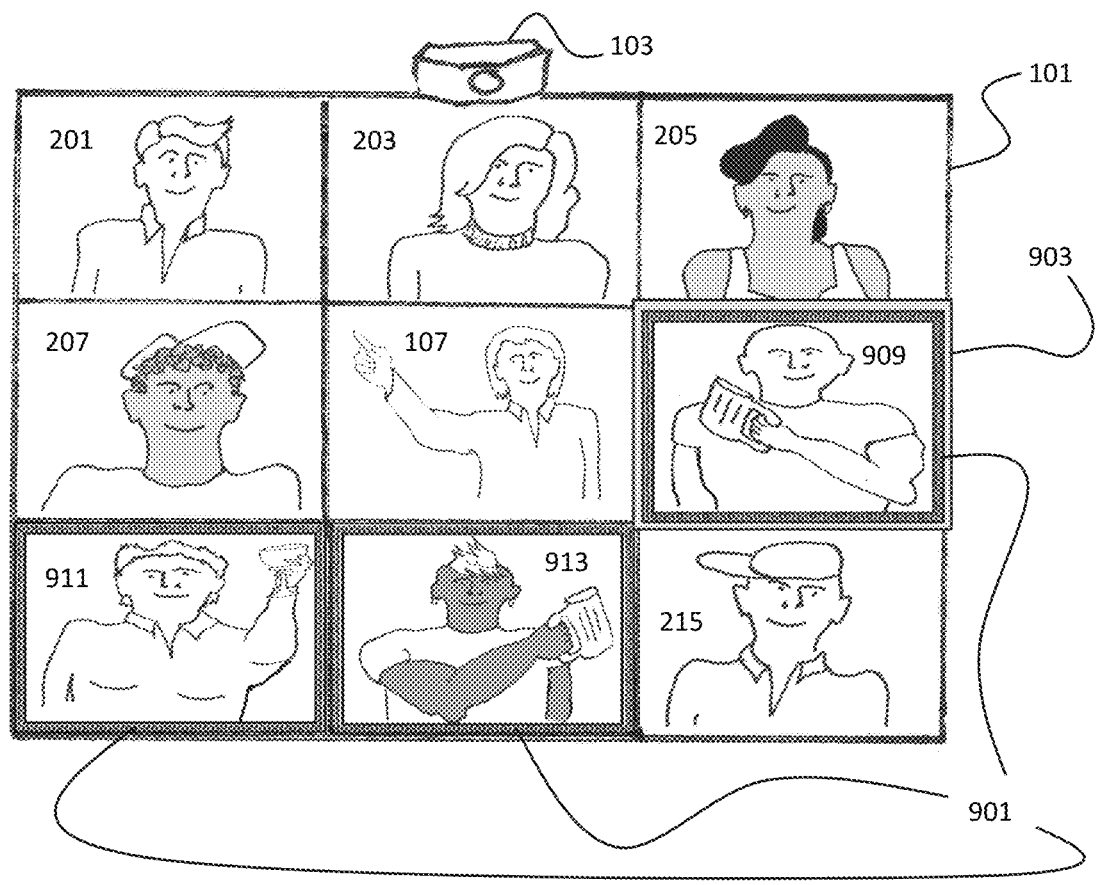
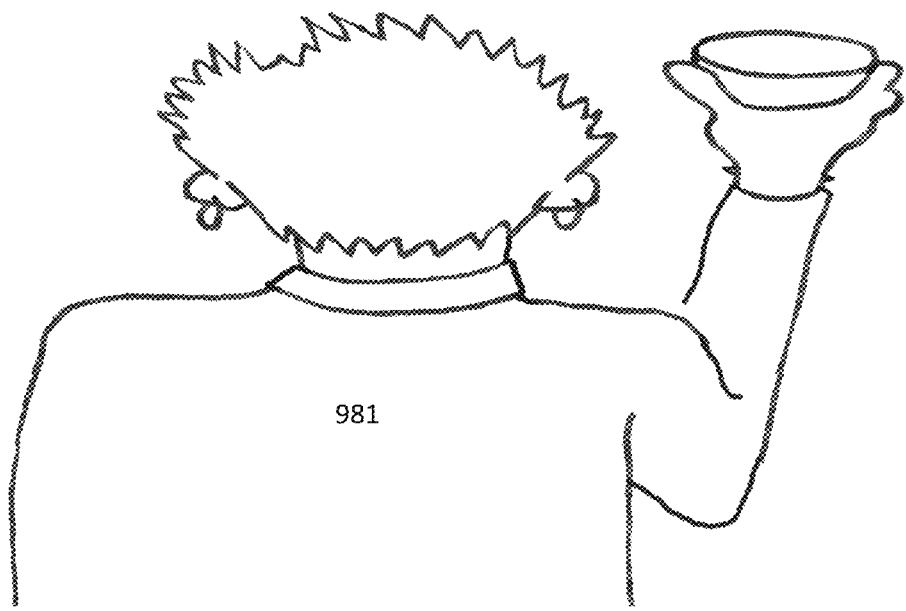
Fig. 9B
User in Fig. 9A viewing video streams from the same individuals, but several minutes later after one of those of which have chosen to show their streams to all as mirrored, proposes a toast to the previous speaker.

METHOD AND APPARATUS FOR DISPLAYING VIDEO FEEDS IN AN ONLINE MEETING USER INTERFACE IN A MANNER THAT VISUALLY DISTINGUISHES A FIRST SUBSET OF PARTICIPANTS FROM A SECOND SUBSET OF PARTICIPANTS

CROSS-REFERENCE TO RELATED APPLICATIONS

This application is a continuation of U.S. application Ser. No. 17/942,635 filed Sep. 12, 2022, which in turn is a continuation-in-part of U.S. application Ser. No. 17/737,201 filed May 5, 2022, now U.S. Pat. No. 11,444,982, which in turn is a continuation of U.S. application Ser. No. 17/565,729 filed Dec. 30, 2021, now U.S. Pat. No. 11,330,021. The disclosures of each of these prior applications are hereby incorporated by reference in their entirety.

This application claims priority to U.S. Provisional Patent Application No. 63/132,617 filed Dec. 31, 2020, which is incorporated by reference herein.

This application is related to U.S. patent application Ser. No. 17/942,627 filed Sep. 12, 2022 entitled "METHOD AND APPARATUS FOR SELF-SELECTION BY PARTICIPANT TO DISPLAY A MIRRORED OR UNMIRRORED VIDEO FEED OF THE PARTICIPANT IN A VIDEOCONFERENCING PLATFORM," now U.S. Pat. No. 11,546,385, and U.S. patent application Ser. No. 17/942,632 filed Sep. 12, 2022 entitled "METHOD AND APPARATUS FOR AUTOMATICALLY CREATING MIRRORED VIEWS OF THE VIDEO FEED OF MEETING PARTICIPANTS IN BREAKOUT ROOMS OR CONVERSATION GROUPS DURING A VIDEOCONFERENCING SESSION," now U.S. Pat. No. 11,595,448.

BACKGROUND OF THE INVENTION

The general field of the present invention is the display of video feeds in videoconferencing systems, as well as their software, hardware, and related physical spaces. These systems are used so that people in different locations, physically remote from each other, can hold meetings in real time, both seeing and hearing each other during the meeting. The invention disclosed herein can make these online meetings more like in-person meetings, by preserving the relative interpersonal focal point of participant gaze and gesture, and making participant presence feel more immediate.

Recent years have seen an increase in the use of videoconferencing systems and software such as Zoom, Microsoft Team, Intermedia Unite and AnyMeeting, Cisco Webex Meetings, ClickMeeting, Google Meet, Slack, Zoho Meeting, Click Meeting, and JoinMe. Use has exploded during the coronavirus pandemic, with the accompanying shelter-in-place orders, demonstrating both their utility and their limitations on person-to-person interaction.

Such videoconferencing and teleconferencing systems employ the Internet to connect people at physically separate (and distant) locations, by way of each person's computing device at that location. A typical computing device used in a videoconferencing system can include, but is not limited to, a desktop computer, a laptop computer, a workstation, computer server, a smart phone, a tablet computing device, or a specially engineered computing hardware for physical conferencing rooms. In the discussions and descriptions below, mention of a computer or computing device is intended to include any and all of the above, and any similar electronic device which performs similar audio-visual and computational functions.

One of the ways of connecting people is for each computing device to send a live video feed of the person(s) situated at (or in front of) that computing device to the videoconferencing system, using a video camera, referred to herein as a webcam. The webcam may be built into the device (such as with a smartphone or many laptops) or might be a peripheral device connected to the computing device, either physically via cable or wirelessly via WiFi or Bluetooth.

Interestingly, on some videoconferencing platforms, when a user sees his or her own image on that user's computer screen, it may appear to the user as a mirror view (flipped left to right) of the camera feed, while every other camera feed the user sees is presented in the original orientation. This system choice may be because most people see others the way the camera does, but are used to seeing themselves only in a mirror. Nonetheless, while the user may see his or her own image in his or her computer screen as a mirror view, in some systems, such as Zoom, the video feed sent to others is in the original orientation. Zoom permits the individual user to turn mirror view on or off, on his or her own computer screen.

An advantage of mirror view is that when a person is watching the screen, certain self-referential actions (like combing his or her own hair, or reaching for a pen in his or her own pocket) will not confuse the user if the user looks at the user's own image in the computer screen. Turning off mirror view can make some ordinary user actions look confusing to the user when he or she sees himself or herself on the screen with other participants as in gallery view. On the other hand, a mirror view has a disadvantage. Words on a sign that the user holds up to the webcam will display backwards to the user and be unreadable by the user, even though the words will appear correctly in an unmirrored camera feed sent to everyone else. This can confuse a teacher presenting a lesson in front of a blackboard filled with writing.

One of the ways that these video feeds are displayed to participants on their computer screens is via a "gallery view" which shows a number of smaller video rectangles of many of the individual video feeds from the people participating in the online meeting—most often composing a rectilinear grid with the rectangles attached to each other. (The look is similar to the old "Hollywood Squares" television program.) The gallery view of other videoconferencing platforms (such as Flymachine) may show the smaller video feeds as hexagons or other non-rectilinear shapes that can also be attached or linked into a chain or mesh rather than a rectilinear grid. The term "thumbnail" will be used to refer to one of these smaller video rectangles (or non-rectilinear shapes) which share the computer screen space with at least one more other video feeds. Putting many or all of the participants' faces on the screen at the same time, attempts to approximate the feeling which a speaking participant has when speaking to a live audience, large or small. It can also create aspects of the ambience of conversing with others at a conference table or in a classroom.

Note, in contrast to "gallery view", a "speaker view" refers to when the screen only shows the feed of the person speaking. Although the videoconferencing software may permit the host to specify several panelists in a panel discussion as speakers (e.g. Zoom meeting software permits the host to spotlight up to nine speakers), the discussion in this disclosure below will refer to all views that show more than one video feed as a "gallery view".

There are many ways prior art in videoconferencing systems have arranged and organized a gallery view of multiple video feeds on the computer screen.

One set of constraints depends upon factors such as the physical size, shape, and resolution of the participant's computer monitor, well as the shape and the pixel count of the virtual window on the screen within which the videoconferencing software "operates" and its video feeds are displayed.

For example, based upon the position of a phone's webcam, those who use a smartphone to participate in a videoconference often hold the smartphone in "portrait" mode (that is, the longer side is vertical and the shorter side is horizontal). This affects both the size and shape of the video feed created by the webcam (i.e. in "portrait" mode), as well as the configuration of screen "real estate" available for showing the video feeds of others. In contrast, most laptop and desktop computers deploy a screen in "landscape" mode (that is, the longer side is horizontal and the shorter side is vertical), and their built-in webcams produce video feeds in "landscape" mode sized to fill up the built-in or default-sized screen.

The maximum number of video feeds that can be displayed on the screen may also depend not only on the screen space upon which they are to be displayed, but also on the processing power of the computer displaying them. (Processing power may include processor speeds, auxiliary video processing chips, multiple processing cores, etc.) An additional concern is making sure that video thumbnails will not be so tiny that all sense of recognition and personal connection is lost. This will depend upon the size of the physical screen and how far it is usually held from the user's eye. For an example of the interplay of these two constraints, Zoom currently is designed to simultaneously display up to 4 video feeds on the screen of a smart phone, 9 video feeds on the larger physical screen of a tablet computer, 25 video feeds on the screen of a laptop or desktop computer, and up to 49 video feeds on some higher-powered computers (such as those using Intel i5-4 core, gen 4 processors).

Note that when there are more video feeds than can be displayed on the screen at one time, the software may produce multiple virtual pages to accommodate additional video feeds or thumbnails, of which the viewer can see only one virtual page at a time. The viewer advances from one page to another by clicking on directional arrows, or (at least with Zoom) sliding a finger along a touch screen in a side-ways scrolling motion. In such situations, the videoconferencing software may include an algorithm to always show hosts, co-hosts, panelists, and speakers at the top of the "first" page. The algorithm may also choose to show the viewer's thumbnail on that first page as well, so that the viewer identifies more with the event.

Generally, as more participants join the videoconference using their respective participant computers, thumbnails of their feeds are added to the gallery view and the videoconferencing software re-arranges the size and position of the video thumbnails—at least until the maximum number of thumbnails (as determined by the algorithm) is displayed. When a participant/user changes the size and shape of the window in which the thumbnail videos are displayed, the videoconferencing software may then re-arrange and/or resize the video thumbnails. For example, in a videoconference with 8 feeds, if one user has a narrow window in "landscape" mode, the videoconferencing software might display a 2 by 4 array (or grid or matrix) of thumbnail videos, consisting of 2 rows of 4 columns each; whereas if that user were to resize the window to be a narrow one in "portrait" mode, the video conferencing software might rearrange the thumbnail display into a 4 by 2 array of thumbnail videos consisting of 4 rows of 2 columns each.

The videoconferencing system may give a participant control over some aspects of display the video thumbnails. For example, if a participant has no webcam (or has turned off the webcam's video feed), a black rectangle labeled with that participant's screen name may be shown instead of a video feed. (Alternatively, a pre-loaded still photograph of the participant may be substituted.) In Zoom, participants can decide not to show thumbnails for those without video feeds. This can be particularly useful, if there are more participants than fit on the screen, but some are joining the conference by telephone, or without video feed.

The arrangement of video thumbnails in gallery view may be determined by an algorithm built into the videoconferencing software. This was the only option with Zoom as recently summer as 2020.

More recently (as of Fall 2020), Zoom allows a viewer/participant to re-arrange the video thumbnails using drag-and-drop. This re-arrangement affects only that participant's view. However, Zoom also allows the host to override this and force everyone's gallery view to follow the host's video order. In Zoom, this feature is called "Follow Host's Video Order."

This latter feature ("Follow Host's Video Order") can be important for the social dynamics of a meeting. When people meet in-person, around a conference table, it is natural to take turns speaking by "going around the table". Before this feature, everyone saw a different gallery view, so was not seated "next" to any particular person. To make sure everyone gave input in the meeting required more intentional moderation by a skilled facilitator, who had to call on participants individually and specifically. With the "Follow Host's Video Order" feature, a meeting can be more self-organized by the participants. In an educational setting, the "Follow Host's Video Order" permits a teacher to have a "seating" chart for the class. Seating charts help teachers run the class and help both teachers and students, recognize everyone attending.

Nonetheless, despite these various features in current and prior art videoconferencing systems, when a participant looks or gestures toward one of the other faces which that participant sees in gallery view, it will look to all other users as if the first participant is pointing towards a different person than the participant intends—in fact, it will look like the participant is pointing in the opposite direction. This is true whether or not a participant uses the mirroring feature described above, and whether or not the "follow host's video order" feature described above is employed. That's because the gesture (as the webcam "sees", records and transmits it) is oriented in a different direction relative to the camera than the gesture is with respect to the screen image to which the user is gesticulating or gazing. (This may seem confusing, but this disclosure will discuss and illustrate it at length.)

This becomes particularly important for using videoconferencing systems to produce live theater or dance with different actors logging in from different computers. It may also enhance online social gatherings via videoconferencing systems, where social gestures towards specific others (such as greetings and toasts) are key.

Until Fall 2021, Microsoft did not employ mirroring in any aspect of its implementations of gallery view. However, Microsoft has used mirroring in its development of the distinct Together Mode—another videoconferencing interface used in Microsoft Teams and Skype. During the pandemic, Microsoft researchers considered how to use its videoconferencing system to create a live remote audience which could provide spontaneous, contemporaneous, on-air reactions to a presenter, teacher, or entertainer (such as a comedian), whose presentations and performances typically feed on connections with and reactions (such as laughter) among the audience. Microsoft currently suggests Together Mode for other types videoconferencing sessions as well.

Microsoft's Together Mode interface is based on (a) showing all participants as being "in the same place" or "in one room" as part of a single video environment—as opposed to the distinct video cells with their differing backgrounds in gallery view—and (b) placing the participants' video streams in pre-determined seats designed and fixed by the scene creator—as opposed to positioning participants "on the fly" such as via Follow Host's Video Order (https://docs.microsoft.com/en-us/microsoftteams/platform/apps-in-teams-meetings/teams-together-mode).

Together Mode does this by using software to isolate from each individual participant's video, the head, shoulders and upper torso of that participant (as if that participant was sitting in front of a green screen), and overlaying each participant video rectangle (with head, shoulders and upper torso, over a transparent background) at a specific fixed location within a common background or scene: https://news.microsoft.com/innovation-stories/microsoft-teams-together-mode/. Published descriptions of Microsoft scenes range from another person's background to a conference table, from a section of auditorium style seating to a fanciful snow fort. The participant video rectangles can overlap within the scene, so that two participants can appear to a viewer as if the participants can "touch" each other, as in a high-five or fist bump. All participant videos are shown as mirrored, in order to preserve the direction of gaze and gesture. See for example, discussion by Jason Lanier about why Microsoft flips participant video feeds in their Together Mode: https://www.techrepublic.com/article/microsoft-teams-this-new-mode-makes-your-video-meetings-less-exhausting-and-more-productive/.

(Zoom's Immersive View has many features in common with Microsoft'sTogether Mode, however, Zoom's Immersive View does not mirror participant video feeds. Instead, Zoom uses the original participant video feeds orientations, while overlaying all participants' videos onto a common background scene.)

Aspects of current videoconferencing systems are programmable by those knowledgeable in the art, who use these systems to develop novel products and experiences. See for example Zoom's SDK (Software Developer Kit) at https://marketplace.zoom.us/docs/sdk/custom/introduction, which makes raw video and audio data available to the developer. See also the Zoom OSC (Open Sound Control) developed by Liminal Entertainment Technologies https://www.liminalet.com/zoomosc. For more general information on OSC see https://en.wikipedia.org/wiki/Open_Sound_Control.

SUMMARY OF THE INVENTION

In contrast with other systems and prior art, the present invention discloses a more natural way for videoconferencing systems to present visual interactions among participants by automatically displaying video feeds using specific mirroring technology and re-arranging video-feed image order in a mirrored fashion. With use of the present invention, when a user points at, gestures towards, or looks in the direction of another person shown in a gallery-style view on his or her computer screen, all other users beholding that gallery-style view at their individual computer screens will understand who the first user is indicating.

The present invention accomplishes this primarily by showing to each "interacting" participant a mirrored image of not only of himself (or herself), but all other participants with which that first participant is interacting. In some cases, this will be all participants. In other cases, such as a panel discussion or an online live theatrical play, only a small portion of the participants may be 'interacting", with rest of the participants viewing the production as a mostly passive audience. In addition, in certain cases with some participants interacting and others watching the interactions, the array of thumbnails of those interacting—that is, the arrangement of their video feeds on the screen—will have to be mirrored as well.

This disclosure encompasses a number of embodiments. In some of these, the host, or person managing the performance, panel discussion, or event, determines or selects which participants need to interact—and engages the present invention to help facilitate that. In others, some participants agree among themselves to interact, such as two attendees at a Zoom dance party who want to dance "together"—and they choose to engage the participant-oriented embodiment of the present invention to enhance their interpersonal communication. The specifics determine what must be mirrored and how, but in any event, the present invention provides additional ways to communicate among participants—that is, with gesture and gaze—which are more like in-person meetings.

BRIEF DESCRIPTION OF THE DRAWINGS

The foregoing summary, as well as the following detailed description of the present invention, will be better understood when read in conjunction with the appended drawings. For the purpose of illustrating the present invention, there are shown in the drawings embodiments which are presently preferred. It should be understood, however, that the present invention is not limited to the precise arrangements and instrumentalities shown. In the drawings:

FIG. 4 is a generalized diagram of a video conferencing system in accordance with one preferred embodiment of the present invention.

FIG. 6A is a flow chart of prior art technology for a host re-arranging the viewing order of video feeds in a gallery view that the host sees, and for that host to then impose that viewing order on the arrangement of video feeds in the gallery view that session participants see.

FIG. 9A is a generalized diagram of a user in front of the user's computer screen showing nine video feeds streaming in gallery view. The streams are of the same individuals as shown in FIG. 2A, but three of the video feeds are mirrored. The mirrored video feeds are displayed with a visually distinct border around them. The user watching the nine video feeds is the participant shown watching the screen in FIG. 3E and FIG. 3F, who is one of the participants whose video is shown on the screen as mirrored, and is not the person speaking in FIG. 2A. The video image of the person speaking has a different distinct border to indicate which participant is speaking.

FIG. 9B is a generalized diagram of the same user shown in FIG. 9A viewing video streams from the same nine individuals as in FIG. 9A, but several moments later while a different participant is speaking and the after the three mirrored individuals make different gestures.

DETAILED DESCRIPTION OF PREFERRED EMBODIMENTS

Certain terminology is used herein for convenience only and is not to be taken as a limitation on the present invention. The words "a" and "an", as used in the claims and in the corresponding portions of the specification, mean "at least one."

Consider first a description of a generalized teleconferencing/videoconferencing system. The term "videoconferencing" refers not only to conferencing systems with video feeds, but some combination of video and audio feeds. Some connecting devices may have capabilities for both video and audio interactions, whereas others, such as telephones and "non-smart" phones, might have capabilities for audio only (FIG. 4, 413). At times, a user may connect using two devices: one audio only (such as a telephone) and one video only (such as a computer with a webcam but no working microphone).

Figure 5:
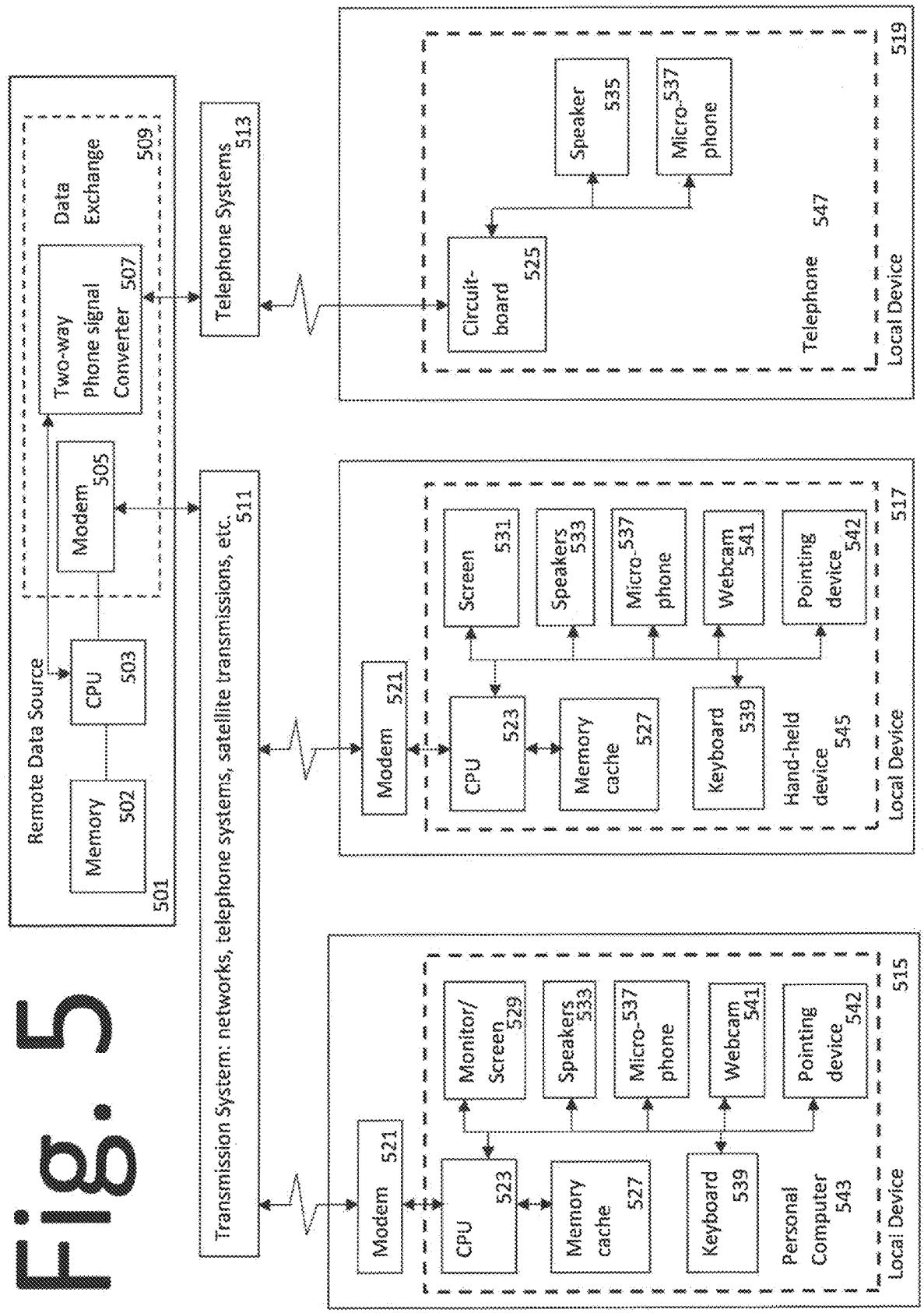
FIG. 5 is a schematic view of major components of the video conferencing system shown in FIG. 4.

The term "non-smart" phone refers to telephones which do not have CPUs and do not transmit their signals using modems. A "non-smart" phone is shown in FIG. 5, 547 as well as FIG. 4, 413 (for CPU see FIG. 5, 523 and for modem see FIG. 5, 521). Such phones may be analog, rather than digital, and do not usually have capabilities for receiving or transmitting video, consequently, they frequently do not have a video screen (529) or webcam (541). They usually have only limited flash memory (at most), and not the kind and amount of memory cache, 527, deployed by the present invention.

Of course, more than one person can participate in the conference using the same device, such as two people, 425 and 427, sitting in front of the same laptop computer, 415. This can be the situation for other devices shown (including even a telephone, 413, when it has a speaker instead of or in addition to an earphone). In some cases, specially outfitted physical rooms (not shown) are outfitted with large screen monitors, cameras, speakers, and computing equipment, which perform the same audio-visual display and input-transmission functions as the devices shown. For example, the Zoom company calls rooms outfitted with their equipment "Zoom rooms." A Zoom room permits more than one person—often several people around a table, or even a larger crowd in an auditorium—to join a conference occurring in several locations at the same time.

Nonetheless, even with more than one person in front of and using the same interfacing device, the interfacing device captures only one audio-video stream, so all the people using that device will be referred to collectively, in the description below, as a single "participant" or a single "user".

The interfacing devices are connected to (433) a transmission system (401) and they are connected to each other virtually through a transmission system, 433 and 401. The transmission system, 401, includes, but is not limited to, the Internet and other networks, telephone systems including land line systems, cell phone systems, VOIP (voice over internet protocol) systems, satellite, and other radio transmission systems, as well as other wireless transmission systems such as (but not limited to) WiFi and Bluetooth. The interfacing devices may be connected (433) to the transmission system (401) by various ways, including, but not limited to, wire, coaxial cable, Ethernet cable, fiber-optics, WiFi, Bluetooth, and radio transmissions.

Many video conferencing systems also include one or more computer servers "in the cloud", such as 403, 405, and 407, which are connected (431) to the transmission system, 401. These computer servers may perform all of the video and audio processing for the video conferencing system (a central processing system) or only some of the video and audio processing (a system with a mixture of local processing and central processing). (Some peer-to-peer video conferencing systems might not include any such computer servers.) The servers may be multi-purpose, or might have specific capabilities such as data processing or video processing. They may be database servers, web servers, video streaming servers.

Consider now FIG. 5, which is a more schematic view of the components of the video conferencing system in FIG. 4. The remote data source, shown in FIG. 5 as 501, might reside on a computer server, such as those shown in FIG. 4. as 403, 405, 407, or without loss of generality, the data might be distributed among them.

The transmission system shown in FIG. 4 as 401, is shown as bifurcated in FIGS. 5 (511 and 513) in part, because the processing and transmission of audio-only signals from "non-smart" phones (547) do not use modems (505 and 521).

The video conferencing system includes a variety of local devices, with representative examples shown (515, 517, and 519). In particular, consider local device, 515, a personal computer, 543, such as, but not limited to, 415 or 417 in FIG. 4. The local device includes a CPU, 532, a memory cache, 527, used in processing, a monitor or screen, 529, and speakers, 533, to display video and audio, respectively, as well as a microphone, 537, and camera (or webcam), 541, for audio and video input (respectively), along with a keyboard, 539, for alphanumeric input, such as for text chat, and a pointing device or interfaces, 542, such as mouse, trackball, touchscreen, touchpad, or stylus. Note that for many desktop computers, such as pictured in FIG. 4. 417, the monitor, speakers, microphone, webcam, and keyboard are not built into the main housing of the computer as they are in a laptop computer (415), but are connected as accessory peripheral devices. However, they serve the same function, and output to them as well as input from them are processed by the CPU, 523, in the same way. (Other input devices such as pointing devices, 542, as embodied in a touch pad, computer mouse, or touch screen, may be used to control some aspects of a video conferencing system.)

In general, input to the local device, 515, via keyboard, 539, microphone, 537, webcam, 541, or pointing device, 542, is processed in the CPU, 523. The portion of that input to be sent through the videoconferencing system is then converted by a modem, 521, to signals transmissible through the transmission system, 511.

Local device 517, a handheld device, 545, such as a smart phone (FIG. 4, 409) or tablet (FIG. 4, 411) has the same components: CPU, 523, memory cache, 527, screen, 531, speakers, 533, microphone, 537, webcam 541, keyboard, 539, pointing device, 542, and modem, 521. Input to a handheld device (515) via keyboard, 539, microphone, 537, pointer device, 542, or webcam, 541, is processed in the CPU, 523, stored in memory, 527, and when appropriate, converted in a modem, 521, and sent to the transmission system, 511, in the same process as for local device, 515.

The signals are transmitted through the transmission system, 511, to other local devices, such as 517, or are transmitted to a remote computer server (FIG. 4, 403, 405, or 407) acting as a remote data source, 501. There, during data exchange, 509, the modem, 505, converts the signal to one which can be processed by the server CPU, 503, which may store the signal, in memory, 502, or retrieve data from memory to help with processing, and then resend to the local devices (such as 515 and 517) via modem, 505, and transmission system, 511. When the data signal reaches a local device such as 515 or 517, the modem, 521 (labeled the same in both devices), converts the signal to one that can be processed by the device CPU, 523. The CPU may store some of the data in memory cache 527, or use data from memory cache to process that received data. In any event, the CPU, 523, transmits the signal to the screen, 529 or 531, and speakers, 533, where it is heard by people (FIGS. 4, 419, 421, 425, 427, and 429) in front of the device, 515 and 517.

In contrast, when the local device, 519, is a "non-smart" telephone, 547, the user of the device can only experience the audio portion of the video conference through the device. Sound from the virtual conference can be heard through the speaker, 535, and input is obtained through the microphone, 537. When receiving input from the microphone, 537, the audio signal is sent to the circuit board, 525, which converts it for transmission via wire or radio wave to the telephone system, 513, which transmits it to a remote computer server, 501, via a data exchange process, 509 and a phone signal converter, 507. After that, the remote data source might process the digital signal in its CPU, 503, possibly storing some of that information in memory, 502. The CPU may also send a processed signal to the phone signal converter 507, then through the telephone system, 513, to a local device, 519, which is a telephone 547. The circuit board, 525, converts the signal to an audio signal and plays it on the speaker, 535.

Now consider a generalized description of the ways in which a user (105 of FIG. 1A, FIG. 1B, FIG. 2A, FIG. 2B, FIG. 3A, and FIG. 3C) who is accessing a videoconferencing system via a computing device with a screen (101) and webcam (103)— such as the devices pictured in FIG. 4, 409, 411, 415, or 417—interacts with the video feed on the screen of the device in front of him or her.

Figure 1B:
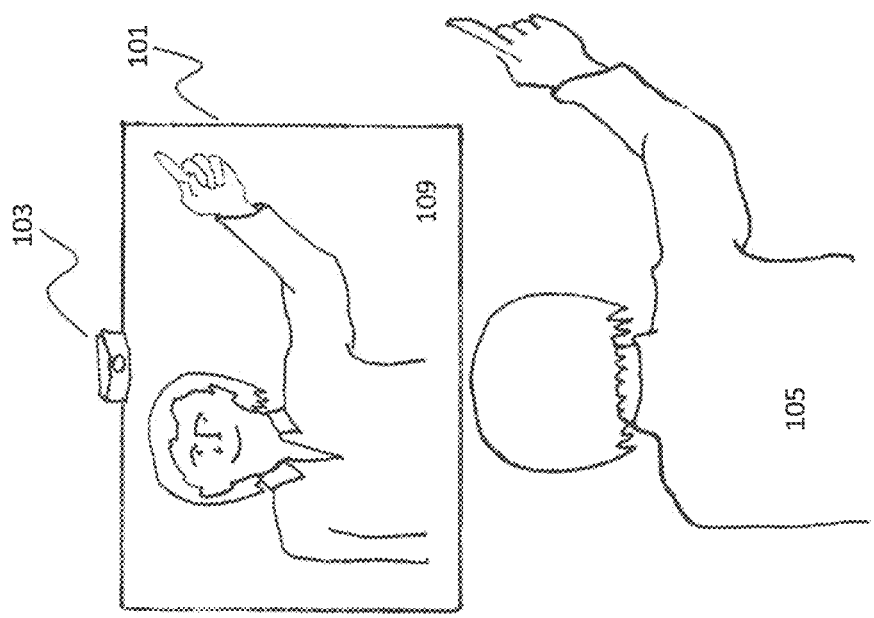
FIG. 1B is a generalized diagram of a user in front of the user's computer screen, showing a mirrored video feed of the user.
Figure 1A:
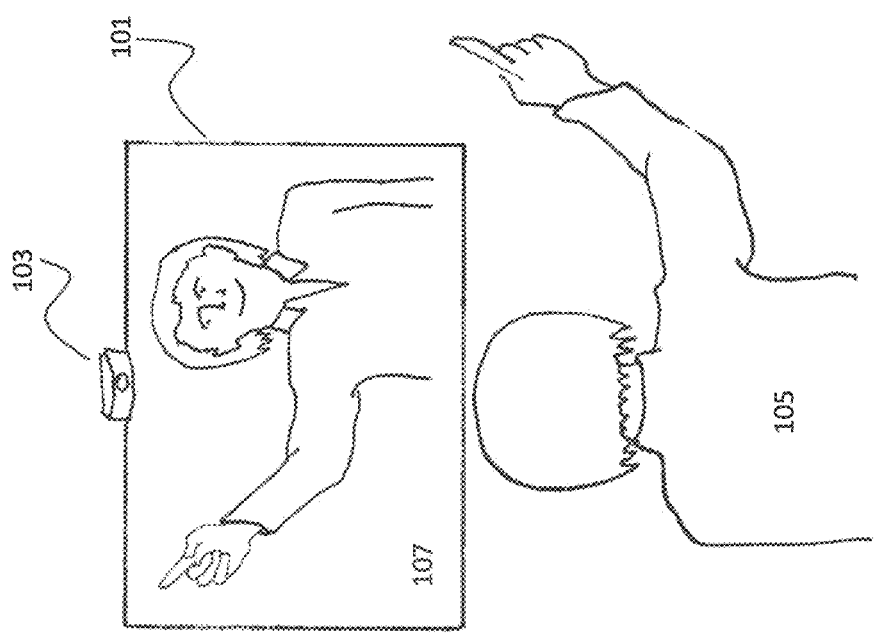
FIG. 1A is a generalized diagram of a user in front of the user's computer screen, showing standard video feed of the user.

FIG. 1A shows user, 105, looking at a screen 101, with the video feed of the user 107 captured by webcam 103. The video feed displays exactly how a user would look if an observer had placed his eye at the location of the webcam lens and looked toward the user. The user (105) is pointing with the right hand. Importantly, when the user (105) looks at the image on the video feed (107), the image of the user's right hand is pointing towards the left of the actual user (105). If instead, the user was looking at a real person standing at the approximate location of the screen, the observed person's right hand would be on the left of the observing user. Think about when you shake hands (right hands) with a person standing in front of you. If the user is holding a sign with words, or there are words on a poster or blackboard behind the user, the video feed will display them so that they can be read from left to right. This is how the video feeds of teleconferencing systems are most usually displayed.

FIG. 1B shows user, 105, in front of the same screen (101), with the video feed captured by the same webcam (103). However, the image is first processed, by methods well known to those practiced in the art, so that it is displayed as a mirror image 109 of the user. (Zoom and Google Meet offer this option. Microsoft Teams began to offer this feature in November 2021: https://www.onmsft.com/news/microsoft-teams-mirror-my-video-meetings.) People are used to seeing themselves in the mirror, so this (109) is how most of us see ourselves, rather than 107. Many people not only comb their hair in front of mirrors, but practice their speeches and presentations in front of mirrors. For this reason, many are more comfortable participating in a video conferencing session in which they view their mirror image (109) rather than their unmirrored one (107). However, if they hold up a sign with words, the words will look backwards in the mirror image. In addition, the unmirrored image (107) is how the user will appear to people when they see the user in-person.

For these reasons, many video conferencing systems show the user a mirrored image (109) of him or herself, while transmitting the unmirrored image (107) to others. (Zoom, Microsoft Teams, and Google Meet allow the user to choose to see his own image either mirrored or unmirrored, but all three transmit only the unmirrored image to others. Microsoft Teams also offers a "Together Mode" option, which mirrors all feeds, discussed in more detail below.) In other words, FIG. 1B shows what the user sees, but the video feed 107 of FIG. 1A shows what a different participant in a video conference would see.

For example, when using Zoom, a user can start a videoconference with just himself or herself. A user may do this in order to adjust room lighting or test the best microphone position. FIG. 1A is what this would look like for the user with mirroring turned off. FIG. 1B is what this would look like for the user with mirroring turned on. Also, FIG. 1A and FIG. 1B are what a user would see in a video conference if the user was the speaker and had turned on "speaker view' or the equivalent. (For example, if the user had "pinned" his or her video, or the host had "spotlighted" this user's video.)

Figure 2A:
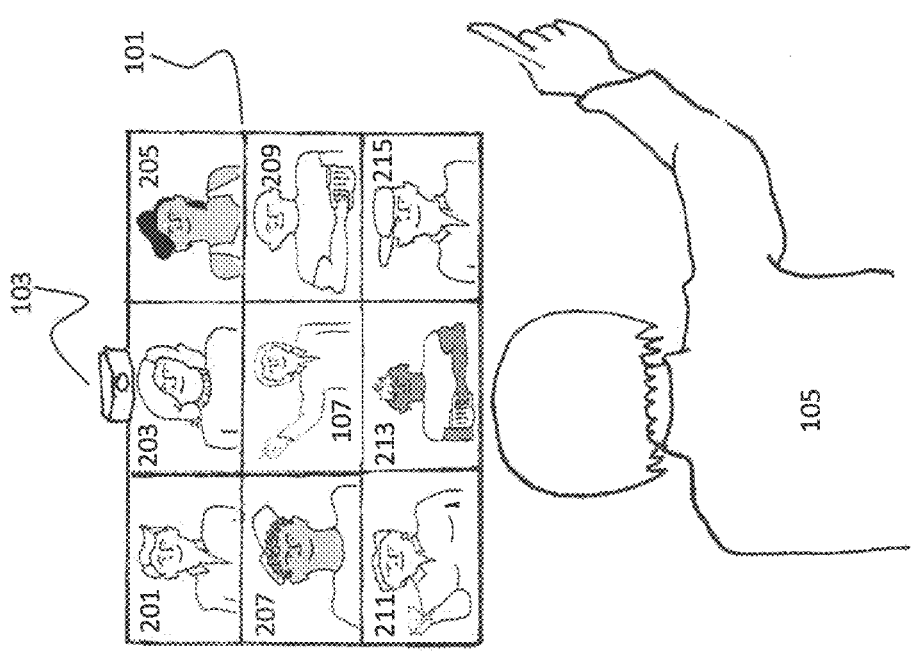
FIG. 2A is a generalized diagram of a user in front of the user's computer screen, showing gallery view of the standard video feeds from nine participants arranged in a 3 by 3 grid, with the user's video feed in the center.
Figure 2B:
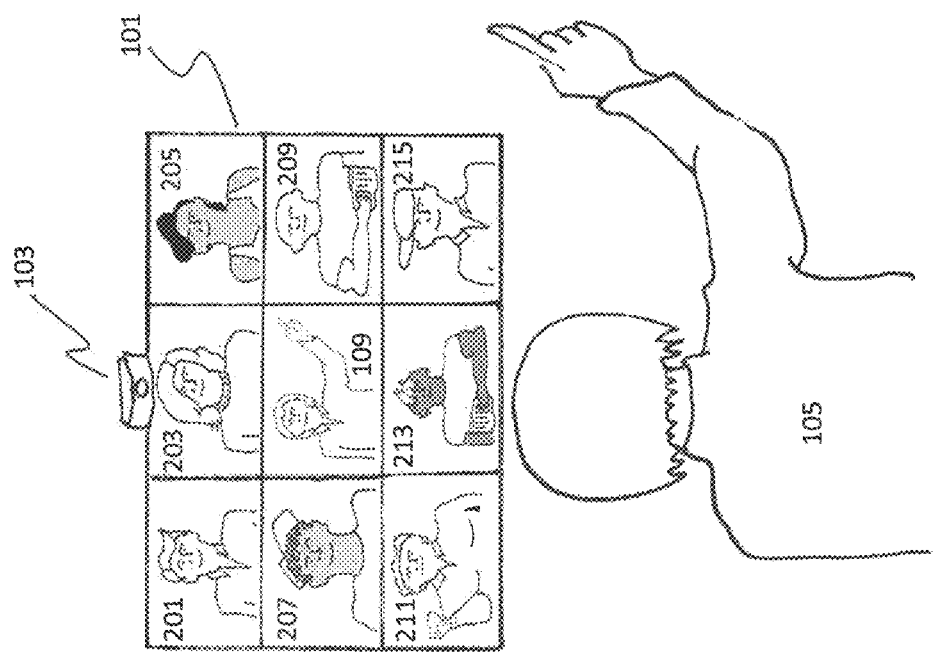
FIG. 2B is a generalized diagram of a user in front of the user's computer screen, showing gallery view of the video feeds from nine participants arranged in a 3 by 3 grid, with the user's mirrored video feed in the center, and the video feeds from all other users standard (and not mirrored).

Consider now FIG. 2A and FIG. 2B which show what the screen would look like in "gallery view", with the video feed from user 105 displayed in the center of the grid, and the video feed from others positioned around it.

FIG. 2A shows a gallery view of 9 people (including the user) in a 3 by 3 grid with un-mirrored video feeds (and with mirror view turned off). The nine video feeds are labeled 201, 203, 205, 207, 209, 211, 213, 215, plus the user 107. The user's image, 107, is in the center of the grid. Note that FIG. 2A is the gallery view that partners with FIG. 1A speaker view.

FIG. 2B shows a gallery view of the same 9 people (including the user) in a 3 by 3 grid, but with mirror view of the user's image turned on. The nine video feeds are labeled 201, 203, 205, 207, 209, 211, 213, 215, plus the user 109. Note that FIG. 2B is the gallery view that partners with FIG. 1B speaker view. Note also that only the video feed (109) of the user (105) is mirrored. All other feeds in FIG. 2B are unmirrored and the same as in FIG. 2A. Importantly, under current and prior art, while the user might see FIG. 2B, other participants (particularly those participants other than the nine whose feeds are shown) will see FIG. 2A.

Consider how it is difficult and confusing for a user to interact with the images on the screen. In both FIG. 2A and FIG. 2B, the user (105) is pointing to the image of the woman in feed 205 (the upper right corner of the screen as the user faces the screen). If the user is looking at the mirrored image (109 in FIG. 2B), it looks to the user as if the user is pointing to 205. However, everyone else (including the woman in feed 205) sees the gallery view shown in FIG. 2A. To every other participant in the videoconference, it looks like the user (105) is pointing (107) to the man in 201 (in the upper left corner of the screen). That is, if the user points to one video feed in gallery view on the screen, to everyone else it will appear that the user is pointing to someone on the opposite side of the screen!

To think through this another way, under prior art, if the user wants to appear to other viewers in the videoconference to be pointing to one person (say the person in feed 201), the user must point to someone on the opposite side of the screen—more specifically the pointing gesture must be oriented with respect to a mirroring of the array of the video feeds. This may be easy for trained actors who can visualize phantom images as if in a mirrored array, but for most people, this type of interaction with visualized images arranged in the mind differently than displayed on screen is difficult.

Consider now some ways to arrange and process video feeds so that (1) users can interact with people's images as manifest in video feeds (i.e., the users can gesture or gaze towards the images in the video feeds) in a natural manner, (2) other viewers will see the interactions (gestures and gazes) as directed towards those the first user intends, and (3) viewers will see each individual un-mirrored as that person would appear in-person. This description below shows that these three goals cannot all be reconciled for all videoconference participants. Afterwards, flow charts showing how these arrangements can be effected through image processing are presented and described.

What FIG. 2B demonstrates is that a user's video feed needs to be mirrored (for both user and viewer) for a user to gesture or gaze towards a video feed image, and appear in the user's (and viewer's) feed to be making the gesture towards that person. But just as importantly FIG. 2B and FIG. 2A show that if another participant sees a mirrored feed of the first viewer, that second participant will understand whom the gesture is directed towards. This means that each person who is interacting with others needs to see his or her video feed as mirrored, and needs to see a mirrored version of the people with whom he or she is interacting. This is illustrated in FIG. 3A.

Currently, a Zoom, Microsoft Teams, or Google Meets user can elect to have his own video feed mirrored on his own screen in gallery view, but he cannot choose to mirror the feeds of others, force others to see his feed as mirrored on their screens, or force others to see their own feed as mirrored on their own screens. (In contrast, some non-interactive streaming services such as Facebook Live stream mirrored versions of the feed. Together Mode does as well, see below.) Currently in Zoom, a user can re-arrange (and set the positions of) the thumbnail video feeds in gallery view on the user's screen, but only the host can force this arrangement on all participants. There is no setting for the host or user to automatically mirror the positions of the various video feeds in a gallery view array, though Microsoft's Together Mode will provide such mirroring if the user wants or can accept the additional constraints that come with Together Mode. However, in other respects Together Mode teaches away from the present invention as discussed below in conjunction with the flow charts.

Figure 3B:
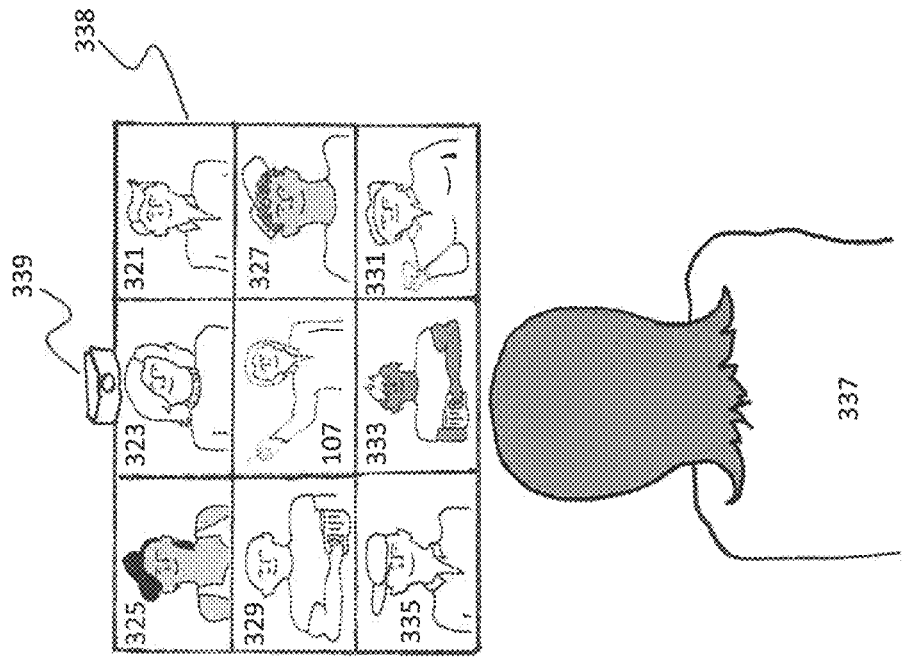
FIG. 3B is a generalized diagram of a user in front of the user's computer screen, showing gallery view of the video feeds from FIG. 3A after processing so that another viewer will see all faces as the camera does (unmirrored) while preserving the focus of gestures from FIG. 3A.
Figure 3A:
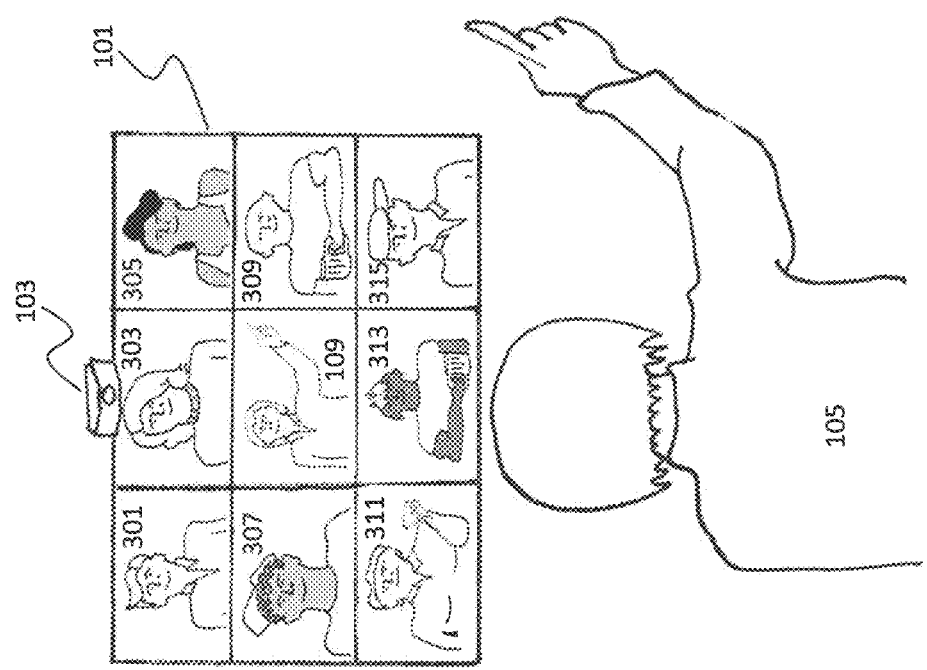
FIG. 3A is a generalized diagram of a user in front of the user's computer screen, showing gallery view of the video feeds from nine participants arranged in a 3 by 3 grid, with the user's video feed in the center, and each of the video leads mirrored.

In FIG. 3A, the video feed of the user (105) is shown mirrored in 109. Likewise, each of the other eight participants are the same as in FIG. 2A, with every video feed shown in the same relative location as in FIG. 2A, but each image (video feed thumbnail) mirrored. That is, 301 is the mirror of 201 (first row, upper left-hand corner), 303 is the mirror of 203 (first row, middle), 305 is the mirror of 205 (first row, upper right-hand corner), 307 is the mirror of 207 (second row, left-most), 109 is the mirror of 107 (second row, middle), 309 is the mirror of 209 (second row, rightmost), 311 is the mirror of 211 (bottom row, lower left-hand corner), 313 is the mirror of 213 (bottom row, middle), and 315 is the mirror of 215 (bottom row, lower right-hand corner).

This arrangement of mirrored video feeds, when shown to all 9 participants will accomplish objectives (1) and (2) above. (Note: each of the 9 participants sees the same arrangement of the mirrored video feeds: the arrangement shown in FIG. 3A.) When any user gestures toward an image of a video feed (or in the direction of that image, even if not an adjacent image), it will appear to that user and the other participants that the user is gesturing towards the intended image, or in that direction.

Consider objective (3) a bit more. FIG. 3B shows a different person (337) viewing a videoconference session on that person's computer screen (338). A webcam, 339, is also shown attached to the computer screen. Every individual participating in the videoconference shown in FIG. 3A is shown in FIG. 3B. More specifically, FIG. 3A and FIG. 3B show views of the same moment of the same videoconference. However, this viewer (337 in FIG. 3B) does not appear among those on the screen, and is not interacting with them. This might arise in a number of different situations: (a) the nine feeds shown are from panelists, guest speakers, or performers, but the user is an audience member whose video feed is not shown, as is typical in webinar-style events, (b) the nine feeds shown are only the first of multiple virtual pages of thumbnail video feeds, and the video feed of the user (337) would appear if the user scrolled to some other virtual page, (c) the user is watching a live webcast of a videoconference (e.g., a Zoom session can be webcast over Facebook Live, YouTube, or Vimeo, but those viewing the webcast are not returning video feeds of their own images to the session and cannot interact with those on the screen).

Viewer 337 in FIG. 3B sees the participants on the screen as they would appear in person (compare to FIG. 2A). To do this, the images in the individual feeds in FIG. 3A have been reversed (un-mirrored); and for viewer 337 in FIG. 3B to understand where people on the screen are directing their gaze or gestures, the video feed of each person shown in FIG. 3A has to be repositioned in mirror-fashion with respect to the vertical left-right axis of the screen. That is, 305 is unmirrored to become 325, and repositioned from the upper-right corner to the upper left corner; 303 is unmirrored to become 323, and retains its position in the middle of the upper row; 301 is unmirrored to become 321 and repositioned from the upper-left corner to the upper-right corner; 309 is unmirrored to become 329, and repositioned from the right-most position on the middle row to the left most position on the middle row; 109 is unmirrored to become 107 and retains its position in the middle of the middle row; 307 is unmirrored to become 327, and repositioned from the left-most position on the middle row to the right-most position on the middle row; 315 is unmirrored to become 335, and repositioned from the lower-right corner to the lower left corner; 313 is unmirrored to become 333, and retains its position in the middle of the lower row; and 311 is unmirrored to become 331 and repositioned from the lower-left corner to the lower-right corner.

Compare the gallery view display of the video feeds on the screen in FIG. 3B (338) to those in FIG. 3A (101). The individual video feeds in FIG. 3B are the unmirrored feeds as captured by the webcams, while each individual video feed in FIG. 3A is a mirrored version of the one displayed in FIG. 3B. However, the participant video feeds in FIG. 3B are positioned within the gallery view array in the reverse column order of the participant video feeds in FIG. 3A. The term "reverse column order" means that the leftmost column in first array becomes the rightmost column in the other array. The second to the leftmost column in the first array becomes the second to the rightmost column in the other array, and so on. "Reverse-column order" is the same as mirroring the column order. Mirroring individual video feeds is different than and distinct from mirroring the column order of the feeds. However, notice that mirroring the entire screen (101) of FIG. 3A will produce the entire screen (338) of FIG. 3B.

Notice that processing and displaying video feeds as in FIG. 3A during video conference, achieves objectives (1) and (2), but not (3) for those participants shown on, interacting on, and viewing the screen. At the same time the processing and displaying of the same video feeds as in FIG. 3B during the same video conference achieves objective (3), especially for other viewers who are not shown on or interacting on the screen, however it does not achieve objectives (1) and (2) for those other viewers. One arrangement of and processing of video feeds cannot meet all objectives. The feeds will need to be presented differently to different classes of viewers, depending upon whether they are interacting or viewing the interactions.

Now compare the arrangement of feeds on FIG. 3B with the "original" order of feeds in FIG. 2A. Note that only the middle column of feeds has remained the same, with respect to the mirror status of the video feed and the person being videoed. That is, 203 is of the same person as 323, 107 is the same person as 107, and 213 is the same person as 333. The video feeds of the left and right columns have been switched—that is FIG. 3B has the reverse column order of FIG. 2A.

Notice that the display of video feeds shown in FIG. 2A was transformed into the display shown in FIG. 3A by keeping the positions of the video feeds the same, but mirroring the image in each video feed. Then, that arrangement of video feeds shown in FIG. 3A was transformed in the arrangement shown in FIG. 3B by re-mirroring the image (which is equivalent to showing the un-mirrored image) in each video feed, plus mirroring the arrangement of video feeds, or equivalently FIG. 3B uses the unmirrored individual feeds of FIG. 2A but in reverse column order. But this display of video feeds is not the same as the originally shown in FIG. 2A.

Images displayed on a computer screen are an array or matrix of different colored pixels. Methods of transforming an image into its mirror and displaying it on a computer screen, that is, creating a mirror matrix, are well known by practitioners of the art. Because the gallery view of a videoconferencing digital video is a series or array of digital images, these methods are employed in mirroring a video feed. These methods can be used to create a mirror image of the array of various video feeds as deployed in gallery view.

Alternately, instead of treating the video feeds as a matrix or array, the videoconferencing system treats the video feeds as an ordered list. The number of items in the list, together with the size and shape of the window in which the video feed thumbnails are to be displayed, are used to determine how many columns and rows of images (thumbnail video feeds) are needed to accomplish the display. Whereas an unmirrored arrangement will map the items in the list from left to right starting at the top row, and proceeding one row at a time, the mirrored arrangement will map the items in the list from the right to the left starting at the top row, and proceeding one row at a time.

Figure 3D:
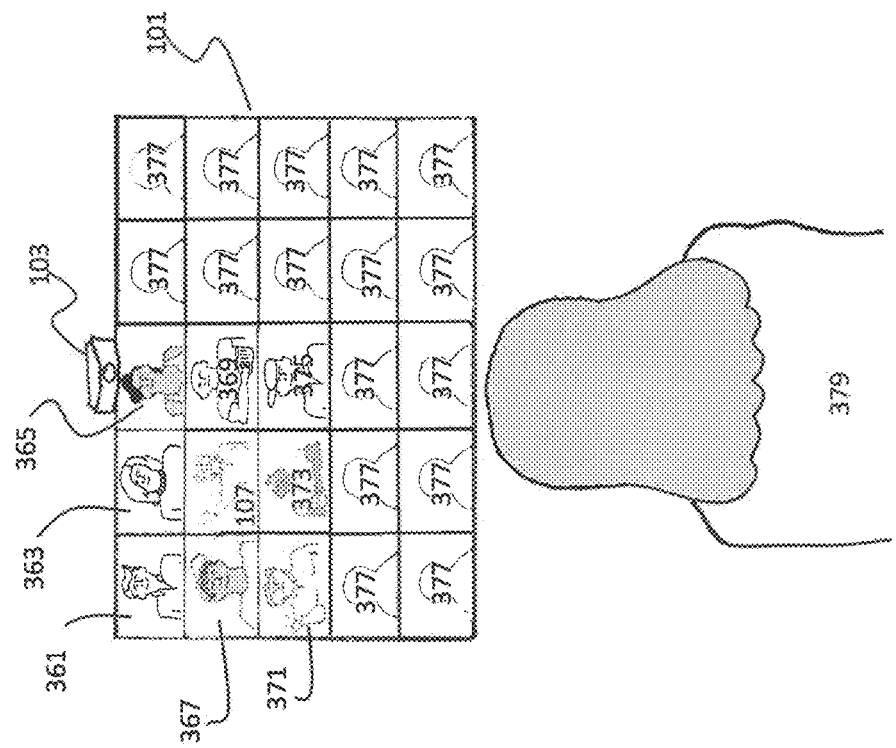
FIG. 3D is a generalized diagram of a user in front of the user's computer screen, where the user is an audience member who is watching the people shown in FIG. 3C as well as other audience members.
Figure 3C:
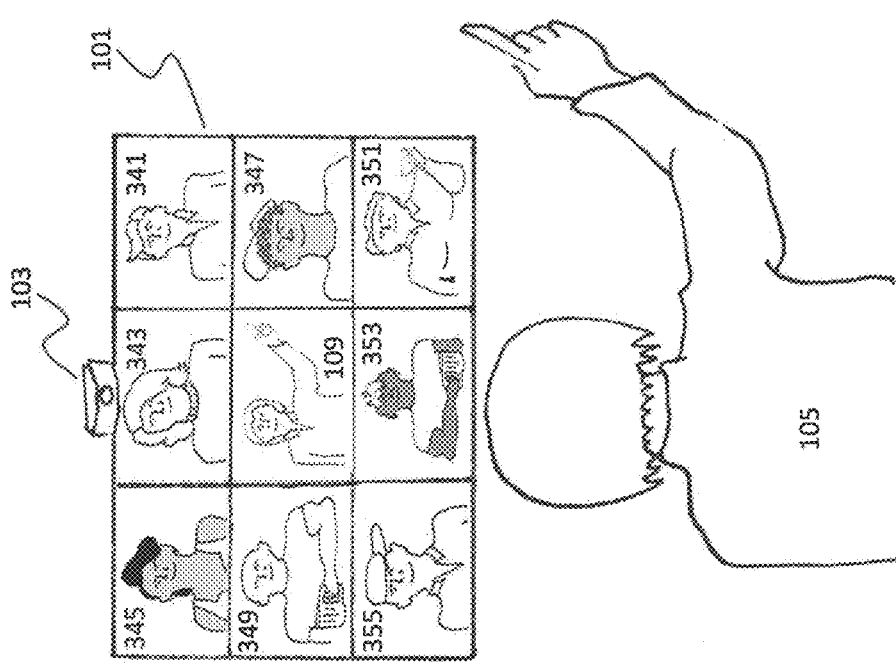
FIG. 3C is a generalized diagram of a user in front of the user's computer screen showing an alternate arrangement of mirrored video feeds. This arrangement, when processed so that another viewer will see all faces as the camera does (unmirrored) and also preserve the focus of gestures, will result in the view shown in FIG. 2A.

Consider now FIG. 3C. This figure illustrates nine mirrored video feeds of the participants in FIG. 2A, but the video thumbnails have been repositioned with respect to the vertical left-right axis of the screen in a mirrored arrangement, that is in reverse column order.

Just for clarity of what the interacting users see, in FIG. 3C, user 105 is viewing the mirrored feeds of nine individuals (341, 343, 345, 347, 109, 349, 351, 353, and 355). When one of those other nine individuals, say 381, the person whose mirrored video feed is 351 in both FIG. 3C and FIG. 3E, views her computer screen, as shown in FIG. 3E, user 381 will see the same thing as user 105: the same mirrored feeds arranged in the same order.

Figure 3F:
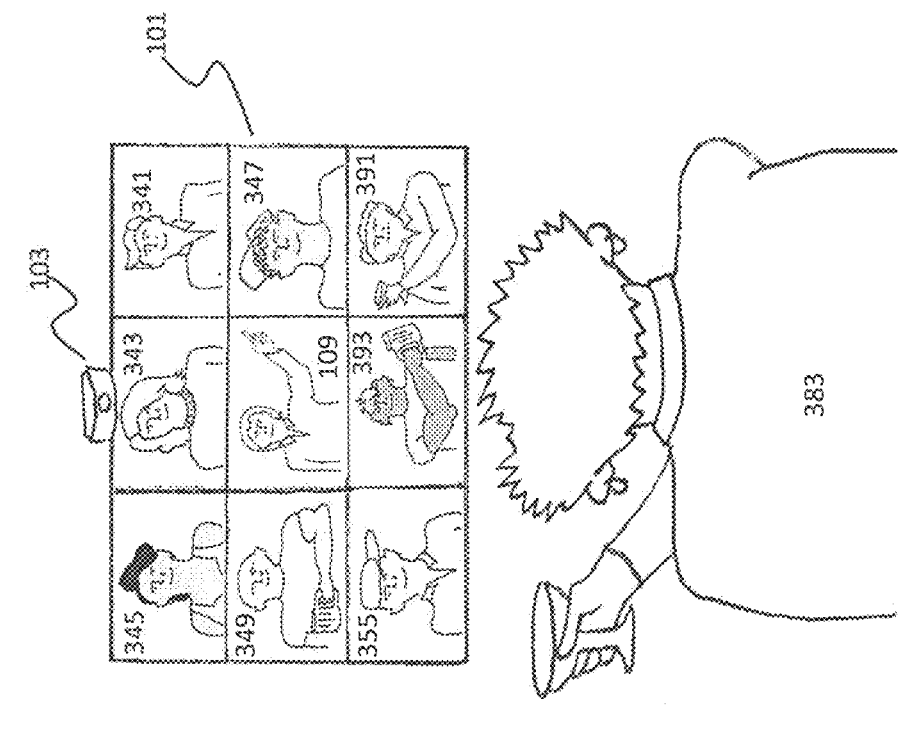
FIG. 3F is a generalized diagram of the same user shown in FIG. 3E viewing video streams from the same nine individuals as in FIG. 3E, but several moments later after the user and one other make different gestures.
Figure 3E:
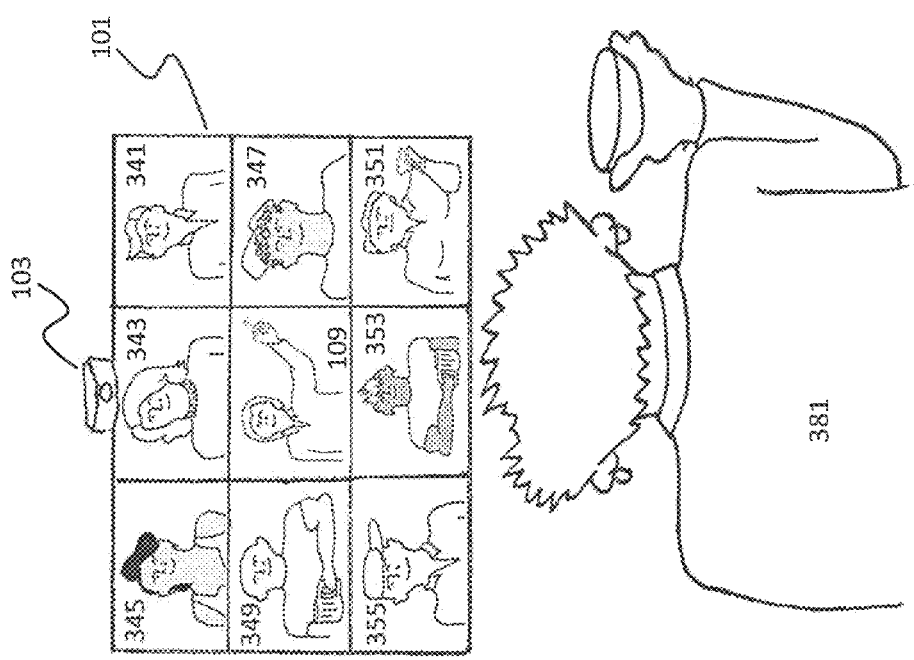
FIG. 3E is a generalized diagram of a user (different than the user in FIG. 3C) in front of the user's computer screen showing the same video feeds as shown in FIG. 3C.

FIG. 3F shows a moment later. User 383 (user 381 in FIG. 3E) has made a gesture of raising a glass of wine in toast to an adjacent mirrored image 393. The mirrored video feed 393 appears to user 383 as to the left of her image 391 on the computer screen 101. (The user shown in 393 is the same as shown in 353, but after he also raises his glass towards the video feed image 391 of user 383, which he sees on his computer screen.) This illustrates how two individuals appear to interact when using the present invention.

Importantly, gestures are neither static, nor as specific as language, and often accompanied by words. For example, a person who says, "All of you," may accompany that statement with a sweeping gesture in the direction of all to whom he is referring. Likewise, gestures are often in a general direction, especially if the gesture is towards someone not adjacent to the gesturer. The gesture may be towards someone farther away, or towards several people in that direction. For example, FIG. 3F also illustrates the gesture that user 383 would make if she said, "Let's toast Alice," where Alice is the individual whose video feed 345 is shown in the upper left corner of the screen. As another example, FIG. 3F also illustrates the gesture that user 383 would make if she said, "Let's raise a glass to the winning sales team of Alice, Tessa, George, Dakota, Matt, and Joe," where the six named individuals are those shown in the video feeds 345, 343, 349, 109, 355, and 353. People hearing the words know all those to whom the gesture is directed, and the gesture adds emphasis and import to the words, when the perceived directionality of the gesture can be seen as towards the individuals intended or named.

In contrast, an individual doing this with unmirrored feeds will congratulate one person, and appear to be pointing to another!

With FIG. 3C, when the video feeds are unmirrored and rearranged to retain relational gesture focus (the process of transforming the video feeds in FIG. 3A into those in FIG. 3B) the feeds will appear arranged in the order of FIG. 2A.

The prior art process in a videoconferencing system such as Zoom is now described, for a host to rearrange the viewing order of video feeds in the host's gallery view, and also for the host to impose that view on the gallery view that all participants see, as illustrated in the flow chart FIG. 6A. The process assumes that as illustrated in FIG. 4 and FIG. 5 (described above), the host has started the videoconferencing session, that participants (419, 421, 423, 427, and 429 in FIG. 4) have logged in, and that video feeds from these participants are being sent from each participant to the system (433), and hence forwarded to all participants with video capabilities.

Referring to FIG. 6A, the process starts (601) when the transmission system received video feeds from the participants, 603. If the host ends the session, 605, the process stops (607). Otherwise, the host can rearrange video feed thumbnails of participants on the hosts screen via drag and drop, 609. This is currently how the host can rearrange the display of video feeds in Zoom. The system orders, identifies and keeps track of the displayed order of video feeds, so that they continue to be displayed in this order on the host's screen. Notice that this only affects the arrangement of video feeds on the host's screen. The host can then decide whether to force all participants to see the feeds in this arrangement or order, by using a feature which Zoom calls "Follow Host's Video Order" (610). Without loss of generality, this feature could be called other names, such as "use host's video arrangement", but Zoom's terminology is used for convenience.

Consider now whether the host has initiated the "Follow Host's Video Order", 611. If not, the Remote Data Source (501 in FIG. 5) uses the transmission system (511 in FIGS. 5 and 401 in FIG. 4) to transmit the standard video feeds without the host's video order to participants (433 in FIGS. 4 and 613 in FIG. 6A).

The term "standard video feeds" is used to indicate the transmission of the feeds ordered (within a gallery view) as they would be transmitted and ordered without reference to any host rearrangement of video order (as in 609). That is, an image in a "standard video feed" would appear as the videoed participants would be seen by people standing where the webcams were located.

After that, each participant's computing device displays the video feeds as received (615), each participant acts, speaks, gestures, or interacts in front of his or her webcam (617) while watching the video feeds (615). Each participant's webcam coupled with the participant's computing device, sends a video of the participant (619) via system nodes C (627) and Z (631) back to the transmission system, 603, and the process starts over.

On the other hand, if a "Follow Host's Video Order" is in effect (611), then the process proceeds via system node A (621) and B (623), and then the Remote Data Source (501 in FIG. 5) uses the transmission system (511 in FIGS. 5 and 401 in FIG. 4) to transmit the standard video feeds with the host's video order to participants (433 in FIGS. 4 and 625 in FIG. 6A).

After that, each participant's computing device displays the video feeds as received (615), each participant acts, speaks, gestures, or interacts in front of his or her webcam (617) while watching the video feeds (615). Each participant's webcam coupled with the participant's computing device, sends a video of the participant (619) via system nodes C (627) and Z (631) back to the transmission system, 603, and the process starts over.

Figure 6B:
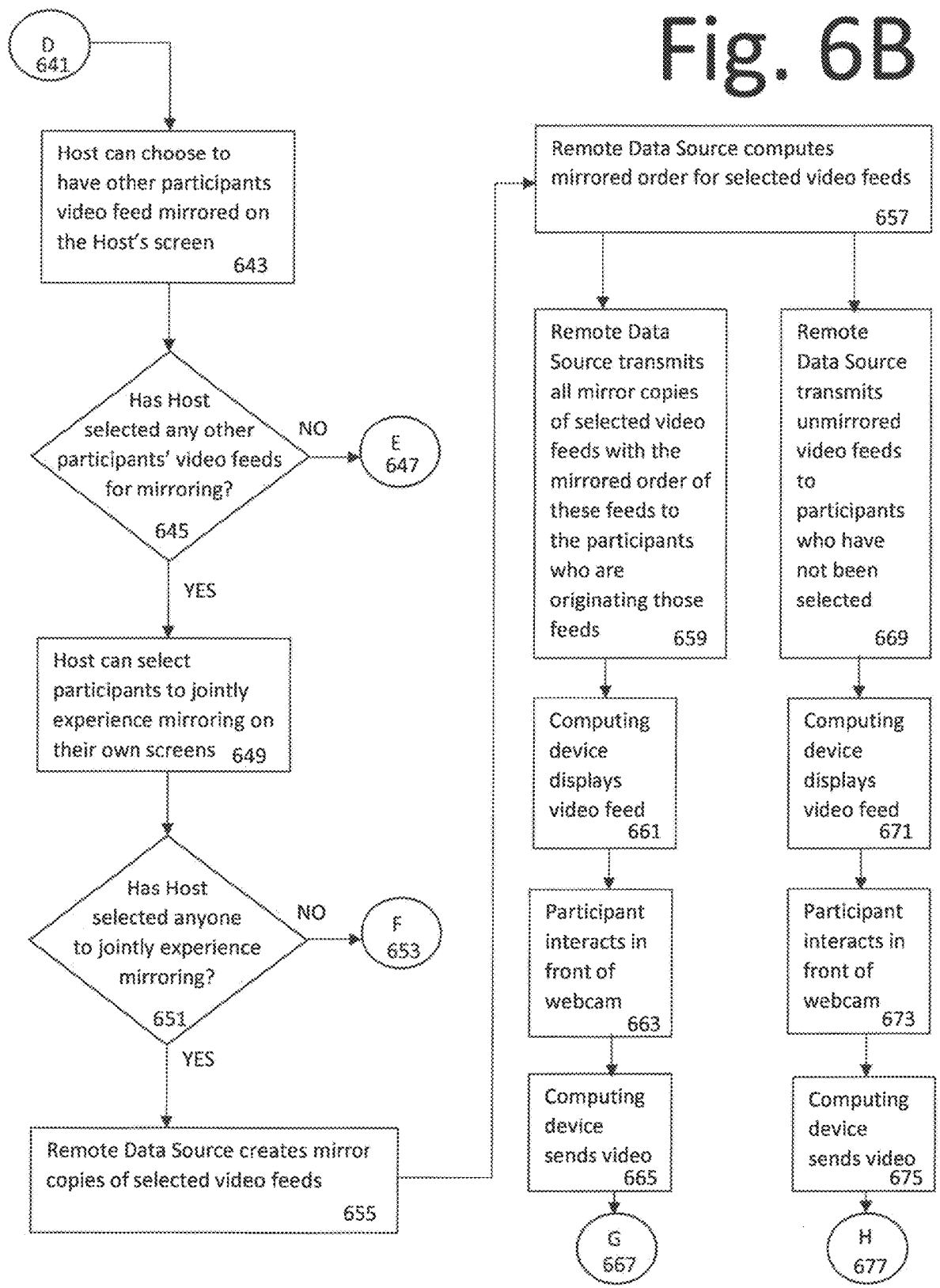
FIG. 6B is a flow chart of aspects of a preferred embodiment of the present invention (initiated by a session host), which when read together with FIG. 6A, becomes a flow chart of a preferred embodiment of the present invention.

Consider now the new teachings of the present invention, using FIG. 6B, to illustrate how they augment the prior art shown in FIG. 6A. In a preferred embodiment of the present invention, the host is offered the opportunity to use several of the features of the present invention:

(a) choose to show some other participants' video feeds as mirrored on the hosts screen (remember that under prior art, the host can only show the host's own video feed as mirrored on the host's screen)

(b) set the order of the video feeds displayed to all of these mirrored participants so that they all see the same spatial relationship among the video feeds (c) choose some participants who will also see these mirrored feeds, but in a mirrored arrangement in reverse column order, such as in FIG. 3C, referred to as "directly interacting" participants, whereas other non-selected participants (referred to as "non-directly-interacting" participants) will see unmirrored copies of participant interactions, as in FIG. 2A or FIG. 3D. (See more about FIG. 3D below.) The directly interacting participants are interchangeably referred to herein as "meeting participants," whereas the non-directly-interacting" participants are interchangeably referred to herein as "additional meeting participants."

Directional gaze and gesture of the directly interacting participants is preserved. These may be conference panelists, actors, performers, or musicians. In contrast, the non-directly-interacting participants take on the role of audience for the directly interacting participants, who may cheer, applaud, question, or comment on aspects of the videoconference session, but for these non-directly-interacting participants, the directionality of their own gaze and gesture is not preserved.

For non-directly-interacting participants, such as participant 379 in FIG. 3D, or those labeled as 371 in FIG. 3D, an accurate view of the directional gaze and gesture of the directly interacting participants (e.g., 361, 363, 365, 367, 107, 369, 271, 373, and 375 of FIG. 3D) can be preserved, along with an unmirrored video feed of each directly interacting participant—but only if the directly interacting participants see their feeds mirrored and the columns of their feeds are displayed in reverse column order (mirrored order) as in FIG. 3C.

More generally, and especially for a gallery view with an array of non-rectilinear video feeds, reverse column order is also a reflection of the arrangement of the grid or mesh with respect to a vertical axis.

Now consider a videoconferencing system which incorporates the present invention (both FIG. 6A and FIG. 6B together). To model the process of these additional features, system node A (621 of FIG. 6A) does not continue directly through node B (623) as discussed when describing the prior art above, but rather proceeds via node D (641 of FIG. 6B) to incorporate the additional processes.

As previously, the process starts (601 in FIG. 6A) as the transmission system receives video feeds from the participants (603). Consider that the host does not end the session (605), but rather rearranges the video feed thumbnails (609), and chooses to impose his video feed on others (610 and 611). Then system node A (621) leads via node D (641) in FIG. 6B to step 643 in FIG. 6B, by which the host can choose to have the video feed of other participants displayed as mirrored on the host's screen, 643.

If the host does not select any video feeds to mirror (645), the process proceeds via node E (647) and node B (623 in FIG. 6A) and the Remote Data Source (501 in FIG. 5) transmits the standard video feed to participants (433 in FIG. 4) with the host's video order (625 in FIG. 6A), and then through the rest of the flow chart of FIG. 6A. In other words, even though the system incorporates the present invention, the host did not elect to use any of its features.

Similarly, if the host does select video feeds to mirror (645) the host can select participants to jointly experience mirroring on their own screens (649). Note that all participants can be selected, but all need not be selected. However, if the host does not invoke this new feature—that is, the host does not select anyone to experience this feature of mirrored video and arrangement of video thumbnails (651)—the process proceeds via node F (653) and node B (623 in FIG. 6A) to step 625. Then in step 625, the Remote Data Source (501 in FIG. 5) transmits the standard (unmirrored) video feed to participants (433 in FIG. 4) with the host's video order, and then through the rest of the flow chart of FIG. 6A. Notice that the host has chosen to use one of the new features (a), but not both, so that only the host sees mirrored video feeds.

Now consider if the host has chosen (a) to mirror some participants, and (b) to have selected them to experience the mirroring together (that is, if both 645 and 651 are answered "YES"). Then the Remote Data Source (501 in FIG. 5) creates mirrored copies of the selected video feed, 655 in FIG. 6B, and computes the mirrored order for those selected video feeds, 657.

When the selected video feed thumbnails form a complete rectangle, such as the nine thumbnails in a 3 by 3 array, or the eight thumbnails in a 2 by 4 array, it is easy to see how the mirrored array could be substituted for the original array while keeping all other thumbnails the same. Let us consider if the selected thumbnails do not form a complete rectangle.

In a preferred embodiment, the host can only select such a complete rectangle of thumbnails, so that the host must first position the video feeds to be selected in such a rectangle array. In an alternative embodiment, the host can select any videos, but the system's software will add dummy thumbnails to complete the rectangular array. These dummy thumbnails will appear black as if the camera for that video feed was turned off. Alternatively, they appear with a pre-specified still image or virtual background, such as the "scenery" for an online theatrical production.

Consider an online theatrical production that wishes to mix the actors and audience, and perhaps have the host move the actors' thumbnails in the course of the performance. For an alternate embodiment designed for this purpose, the system's software sends to the interacting actors a mirror arrangement of all of the thumbnails, including the audience. In an alternative embodiment, the system's software sends the actors only their own video feeds (mirrored and in a mirror arrangement, with black thumbnails filling the rest of the spaces), such as the configuration of nine people shown in FIG. 3C, while sending the audience all the feeds, as in FIG. 3D. Alternatively in a webinar style event, with only panelist video feeds shown to the audience, the panelists/actors might see a screen as in FIG. 3C, while the rest of the audience sees those nine in standard video feed as in FIG. 2A.

In FIG. 3D, a user, or audience member, 379 is looking at a computing device screen, 101 with an attached webcam 103. The screen shows a 5 by 5 array of thumbnail video feeds. The nine video feeds in the upper left corner (361, 363, 365, 367, 107, 369, 371, 373, and 375) are from participants who are directly interacting, such as panelists or actors. These nine feeds are the standard feeds from the nine individual participants whose feeds are shown mirrored (and in mirrored arrangement) in FIG. 3C. In particular 345 as it appears to the actors is shown to the audience as 365, 343 is shown to the audience as 363, 341 as 361, 349 as 369, 109 as 107, 347 as 367, 355 as 375, 353 as 373, and 351 as 371. The other sixteen video feeds labeled 377 are other members of the audience (non-directly-interacting participants).

In an alternative embodiment, the audience thumbnails shown to the actors have a generic silhouette of a person to indicate an audience member.

In another alternate embodiment, to help the actors interact with each other on their own displays, the software might show the video feeds of the actors in full color and the video feeds of the audience in black and white or sepia, using filter methods similar to those which participants can use to enhance their own feeds in Zoom and as known to those skilled in the art. At the same time the non-actors will see all feeds unmirrored, in an unmirrored arrangement, and in full color.

In an alternate embodiment the audience is shown the video feeds with similar filters as described above, so that the audience can more readily distinguish the actors (or panel members) from the audience. The effect is similar in some ways to a theatrical production in which the stage with the actors is bathed in light and the house seats with the audience are dark. The effect can extend to mimicking when an actor goes among the audience and is lit by a follow spotlight, or when an actor sits in the audience area as an "audience member" but is lit by the follow spot as he stands and walks onstage to join the other actors.

Returning to step 657 of the flow chart in FIG. 6B. After step 657, the Remote Data Source (501 in FIG. 5) transmits all mirror copies of selected video feeds with the mirrored order (reverse column order) of these feeds to the participants selected (and who are originating those feeds), 659 in FIG. 6B. After that, each participant's computing device displays the video feeds as received (661), each participant acts, speaks, gestures, or interacts in front of his or her webcam (663) while watching the video feeds (661). Each participant's webcam coupled with the participant's computing device, sends a video of the participant (665) via system nodes G (667) and Z (631 in FIG. 6A) back to the transmission system, 603.

At the same time, the Remote Data Source (501 in FIG. 5) transmits unmirrored video feeds to the non-directly-interacting participants who have not been selected, 669 in FIG. 6B. These unmirrored feeds are arranged per the host's video order, not the mirrored arrangement. After that, each participant's computing device displays the video feeds as received (671), each participant acts, speaks, gestures, or interacts in front of his or her webcam (673) while watching the video feeds (671). Each participant's webcam coupled with the participant's computing device, sends a video of the participant (675) via system nodes H (677) and Z (631 in FIG. 6A) back to the transmission system, 603 in FIG. 6A.

When participant video is sent via node G (667 in FIG. 6B) and H (671 in FIG. 6B) through node Z (631 in FIG. 6A) to 603 in FIG. 6A, the process starts over.

In this manner and as described above, a group of participants selected by the host of a videoconferencing session can interact with each other by gesture and gaze during the session, because the interpersonal directionality of the gesture and gaze is preserved on their screens. At the same time, the non-directly-interacting participants accurately see the interpersonal interactions of the directly-interacting participants, and at the same time see their individual unmirrored video feeds.

(Note how 669, 671, 673, and 675 in FIG. 6B, which apply to participants not selected by the host are the same as 625, 615, 617, and 619 in FIG. 6A, which in FIG. 6A apply to all participants.)

For this flow chart FIG. 6B, the host is automatically included as one of the participants selected in 645, 651, and 659, so that the host will see the mirrored participants in mirrored arrangement. Note that when the host selected the participants in 649, they were in unmirrored arrangement, so this will change how the host sees the gallery view. In an alternative embodiment the host is not automatically included in the selected participants, so would then see a gallery view as non-selected participants do, 669. In another alternative embodiment the host is not automatically included in the selected participants, but sees the same gallery view as the participants do (mirrored with mirrored arrangement as in 659).

In an alternative embodiment, when a host selects a participant to show as mirrored, this action will also select the participant for jointly experiencing mirroring. In other words, in this alternative embodiment, step 643 is combined with step 649, step 645 is combined with step 651, and step 647 is combined with step 653.

As known to those skilled and knowledgeable in the art, without loss of generality, some of the hosts actions shown as steps in FIG. 6A and FIG. 6B may be taken by the host in a different order, with accompanying rearrangement of the steps in the flow chart.

The preferred embodiment discussed above, with respect to the flow chart in FIG. 6B, creates mirror copies of video feeds and sends these mirrored video feeds to selected participants (655 and 659). This embodiment also computes the mirrored order for the selected video feeds with respect to the underlying identification of all video feeds (657) and sends detail of that order to the select participants (659).

In an alternative embodiment, the Remote Data Source (501 in FIG. 5), instead sends the identities of all the selected video feeds to each of the selected participants along with information on the mirrored order (referred to below as "mirroring information"). Then the computing device of each of these participants creates mirrored copies of the identified video feeds locally, and displays them according to the information on the mirrored order. In the example wherein a gallery view is displayed to the participants, this alternative embodiment transmits instructions to the respective participant computers to display the gallery view, as opposed to the previously described preferred embodiment which transmits the rendered gallery view itself to the respective participant computers.

This disclosure has focused on the visual elements of host-selected participants interacting. However, as known to those skilled in the art, if the host-selected participants are featured speakers, panelists, dancers, or actors, whether in a webinar style session or a meeting style session, the host has options to mute all other participants so that the host-selected participants and their interactions are not only the visual focus, but the auditory focus as well.

In another alternate embodiment, to help the participants interact with each other on their own displays, the software shows the video feeds of the participants in full color and the video feeds of the audience in black and white or sepia, using filter methods similar to those participants can use to enhance their own feeds in Zoom and as known to those knowledgeable in the art.

In the above description of FIG. 6A and FIG. 6B, discussion of a host rearranging the order of participant video feeds related to steps in initiating mirroring and the present invention. However, in an alternative preferred embodiment of the invention, after mirroring is initiated, a host (or production engineer) for an artistic performance (such as a play, concert, or dance composition) can continue to re-arrange and re-position video feeds withing a gallery view during the performance. In a preferred embodiment, the video feeds of the actors, musicians, or dancers are all adjacent to each other. As the host re-positions their video feeds, the performers (while still within their own video feeds) appear to move on the screen as if moving around a stage. In an alternative embodiment, the video feeds of the audience are interspersed between the video feeds of the actors, musicians, or dancers. As the host re-positions the performers video feeds, the performers appear to move among the audience.

As is well known by practitioners of the art, Artificial Intelligence (AI) software can be used in combination with the video feeds of webcams to recognize a variety of hand gestures and body poses. See for example gesture recognition in Snap Camera's Lens studio (https://lensstudio.snapchat.com/guides/general/hand-gestures/) as well as their full-body triggers (https://lensstudio.snapchat.com/templates/object/full-body-triggers/?utm_source=lensstudio).

The recognized gestures (as well as body poses and directional orientations) can be used by coders of software programs to trigger other actions. See for example Banuba's use of hand gesture recognition to create touchless user interfaces for real-time program control: https://www.banuba.com/solutions/touchless-user-interface.

In an alternative embodiment of the present invention, the teleconferencing software uses AI to recognize participant gestures (including body poses, body orientation, directional gazes and gestures, and specific motions such as walking in a direction), and then uses those gestures to control changes in placement of the participant's video within the gallery view—rather than the drag and drop actions of the host or production engineer. Gestures trigger the videoconference platform to move the placement of a video to the left, to the right, up, down or along a diagonal.

Figure 7:
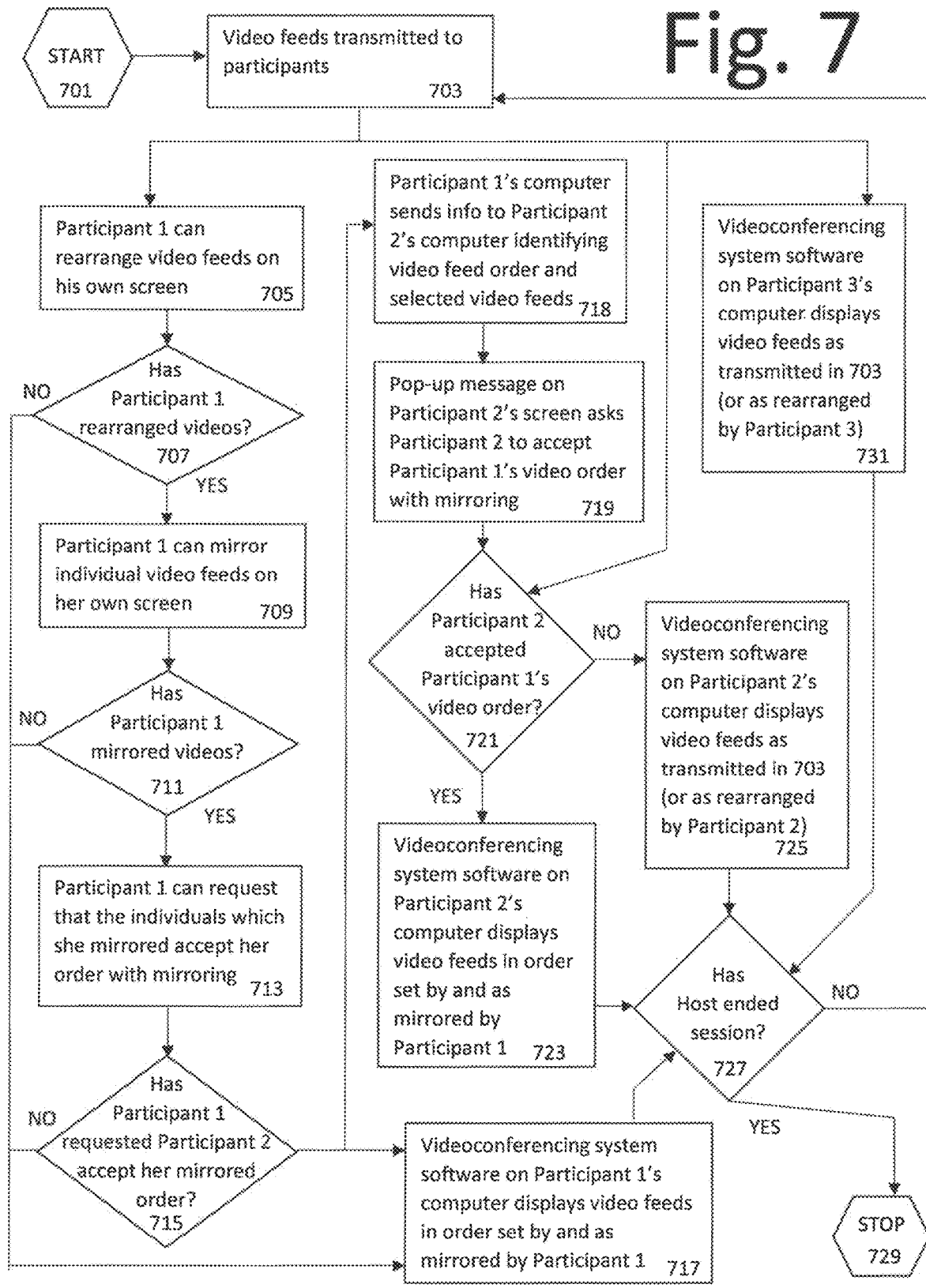
FIG. 7 is a flow chart of an alternative embodiment of the present invention, initiated by a participant, rather than the host.

Consider now FIG. 7, which illustrates the flow chart for an alternate embodiment of the present invention. In this embodiment, rather than sending mirrored feeds themselves, mirroring information is sent on which feeds are to be mirrored locally. This embodiment contrasts with those described above, in that, in FIG. 7 the thumbnail video feed order is not imposed by the host in a top-down manner, affecting the gallery view of all participants, but rather is decided by a group of participants and shared privately among them. This enables and promotes a more bottom-up form of participant interaction.

In a preferred embodiment, some subset of the participants (numbering greater than 1) choose to appear on each of their screens, but not other participants' screens as follows:
  (a) The video feed of each member of this subset is mirrored.
  (b) The video feeds of all members of this subset are adjoining and appear in the same pattern or spatial configuration on each of their screens, also referred to herein interchangeably as being the "same spatial relationship." The term "same pattern" (same spatial relationship) means that the adjoining feeds of each member of the subset—to the left, right, above, below, or diagonal—which are also members of the subset, are the same.
  (c) The video feeds of other participants who are not members of the subset need not be mirrored, but may be.
  (d) The video feeds of other participants who are not members of the subset may, but need not, appear in the same pattern.

More than one non-intersecting (non-overlapping) subsets may form such mirrored clusters.

FIG. 7, discussed further below, illustrates the flow chart for a platform such as Zoom, which in its default mode does not display the same pattern or order of participant feeds to everyone, but allows participants to reposition their video feeds. As is known to those skilled in the art, alternative methods of establishing groups and clusters (not shown in FIG. 7) include invitation from the participant list, the text chat, or the dropdown options available from within the video feeds. Other platforms, particularly ones which use proximity in a virtual space as the method of clustering participants, display the same pattern of participant icons, avatars, or video feeds to all participants, and would establish a mirrored cluster via a different procedure, but in any event, after invitation to mirror cluster and acceptance of that invitation, the screens of the subset of participants appear as detailed above.

FIG. 7 describes an embodiment where the host has not initiated a "Follow Host's Video Order" command. It also assumes (a) that any participant can rearrange the thumbnail video feeds on his or her own screen for the participant's personal viewing (as can currently be done on Zoom) and (b) that any participant can choose to mirror specific thumbnail video feeds on his or her own screen (and not just the participant's own video feed as can currently be done on Zoom). FIG. 7 does not show the transmission of individual video feeds between participants, or from participants back to the videoconferencing system. These certainly occur, however FIG. 7 focuses on how each individual participant's computing device processes the video feeds continuing to be received by it until either the host ends the session (727) or the participant leaves it.

This flow chart shows how participants, such as the nine those shown in FIG. 2A, can choose (after first arranging video feeds) to mirror the video feeds of their group, so that each of them sees all of their group's video feeds mirrored as in FIG. 3A. This enables the group of participants to interact with gaze and gesture—that is, when a participant gestures towards one video feed, all nine will see to which video feed that is directed. Although FIG. 2A and FIG. 3A show a group of nine participants, the group can have a different number of participants. Without loss of generality, nine participants were chosen in the appended figures for convenience when drawing the illustrations. In similar manner, and without loss of generality, FIG. 7 shows only three archetypical participants, not the entirety of the participants in a meeting.

The flow chart FIG. 7 starts (701) when video feeds are transmitted to participants (703). Participant 1 can rearrange the thumbnail video feeds on his or her own screen (705). If Participant 1 has not rearranged video feeds (707), the video conferencing software on Participant 1's computing device displays the video feeds as Participant 1 has left them (717). Then, if the host has ended the session (727) the process stops (729). Otherwise, video feeds continue to be transmitted to the participants (703) and the process continues.

Referring again to FIG. 7, if Participant 1 has rearranged videos (707), she can also mirror individual video feeds on her screen (709). However, if Participant 1 has not mirrored any videos (711), the video conferencing software on Participant 1's computing device displays the video feeds as Participant 1 has specified them (717). Then, if the host has ended the session (727) the process stops (729). Otherwise, video feeds continue to be transmitted to the participants (703) and the process continues.

Alternatively, if Participant 1 has mirrored individual video feeds (711), she can request that the individuals which she selected for mirroring accept both her arrangement of thumbnails and their individual mirroring (713). Without loss of generality, assume that the first such request (if any) is made to Participant 2. If Participant 1 has not made the request of Participant 2 (715), the video conferencing software on Participant 1's computing device displays the video feeds as Participant 1 has specified them (717). Then, if the host has ended the session (727) the process stops (729). Otherwise, video feeds continue to be transmitted to the participants (703) and the process continues.

Choices by Participant 1 have been described that only affect the display of the thumbnail video feeds on her own computer screen. Consider again that she can ask other participants to allow their computer screen to mimic hers (713). Consider now that Participant 1 requests that Participant 2 accept the ordering and mirroring choices of Participant 1 (715).

In this regard, note that on Zoom, Participant 1 could transmit a private message to Participant 2 on Zoom's text chat with the necessary information to manually rearrange the video feeds to mimic the arrangement (with mirroring) of the feeds of Participant 1, by listing the order of all participants, along with a list of participants for mirroring. Instead, the videoconferencing software on Participant 1's computer sends the information to Participant 2's computer. This information is coded similarly to the information that is sent by the host when selecting the "Follow Host's Video Order" feature, along with identification of which feeds are to be mirrored.

At this point, Participant 1's computer sends information to Participant 2's computer identifying the order of video feeds that Participant has chosen as well as the video feeds selected by Participant 1 for mirroring (718).

Meanwhile, Participant 2 is sent the same original video feed (703) that is sent to Participant 1. Participant 2 may also rearrange and/or mirror the thumbnail video feeds on his computer screen (not shown).

Upon receiving a request from Participant 1 to follow Participant 1's order and mirroring, Participant 2's computer displays a pop-up message asking Participant 2 if he wishes to accept this request to follow Participant 1's video order and mirroring (719). However, if Participant 2 does not accept the request to follow Participant 1's order and mirroring (721), his computer displays the video feeds (725) as originally transmitted at the start of the flow chart in step 703, as modified by Participant 2's choice of order or mirroring. Then, if the host has ended the session (727) the process stops (729). Otherwise, video feeds continue to be transmitted to the participants (703) and the process continues.

On the other hand, if Participant 2 accepts Participant 1's arrangement and mirroring (721) then the videoconferencing system software on his computer displays the video feeds in the order set by Participant 1, with individuals mirrored as per Participant 1 (723). Then, if the host has ended the session (727) the process stops (729). Otherwise, video feeds continue to be transmitted to the participants (703) and the process continues.

Consider now Participant 3. Participant 1 has made no request of Participant 3. Participant 3 is sent the same original video feed (703) that is sent to Participant 1 and Participant 2. Participant 3 may also rearrange and/or mirror the thumbnail video feeds on his computer screen (not shown). The videoconferencing system software on Participant 3's computer then in step 731, either displays the video feeds as transmitted to Participant 3 in 703, or as rearranged and mirrored by Participant 3 without regard to Participant 1. Then, if the host has ended the session (727) the process stops (729). Otherwise, video feeds continue to be transmitted to the participants (703) and the process continues.

In this manner two participants in a videoconferencing session can decide to interact with each other by gesture and gaze, and effect interaction during the session. (Think two participants at a Zoom dance party deciding to dance with each other.)

Using this same process, Participant 1 can select additional participants to share mirroring, one at a time. In a preferred embodiment, for Participant 1 to add an additional participant to the group, she must (a) first drag-and-drop the thumbnail video feed of that person to be adjacent to the previously selected (and accepted) participants, and (b) have the group of selected participants arranged in a rectangular array. In an alternative embodiment (in similar manner as discussed with respect to FIG. 6B), a participant (here Participant 1) selects any videos she wishes, but the system's software adds dummy thumbnails to complete the rectangular array. These dummy thumbnails appear blacks as if the camera for that video feed was turned off. In an alternative embodiment, the extra thumbnails shown to the actors have a prespecified image or virtual background.

In an alternative embodiment, videoconferencing AI is used to recognized participant hand and body gesture, and then use recognition of specific gestures to move participants video feeds across the gallery view—rather than via participant use of drag-and-drop.

In an alternative embodiment, in addition to other participants directly adjacent to Participant 1, when Participant 1 moves the video feed of Participant 3 adjacent to Participant 2 (where Participant 2 is adjacent to Participant 1, but Participant 3 is not adjacent Participant 1), Participant 2 can designate Participant 3 as part of a set of participants who form a chain of adjacency, that is each member of the set is adjacent to another member of the set, but not necessarily adjacent to all members of the set. If agreed to by the members of the set, they will all see the video feeds of this set of participants as mirrored and the will all see the video feeds in the same spatial relationship. In an alternate embodiment, Participant 2 (who is adjacent to Participant 1) can add participants who are adjacent to Participant 2 to the chain of adjacency even if they are not adjacent to Participant 1.

Consider an alternative embodiment based on a videoconferencing platform using proximity in a virtual space to establish conversation clusters. Consider a cluster or circle of participants who are in conversation together as a group, and whose members all see the video feeds of each other as mirrored and in the same spatial relationship to each other, thereby forming a chain of adjacency. Then when another participant moves his or her own video feed into proximity to this group or chain, the system will ask if the new participant wishes to join the group, circle, or chain. If the participant agrees, the participant's video feed will become part of this mirrored group (with the new participant's video feed mirrored as well), and will appear to all members of the group to be attached to the chain in the vicinity where the participant moved his or her video feed.

In this manner a group of participants in a videoconferencing session can decide to interact with each other by gesture and gaze, and effect interaction during the session.

Consider for a moment how Microsoft's Together Mode, which preserves directional gesture and gaze among participant video feeds, teaches away from the present invention.

1. The present invention preserves distinct backgrounds of individual participants' video feeds in gallery view, creating visual interest and relieving meeting eye-stress. In addition, preserving individual choice of backgrounds allows participants to maintain personal "desk" space. In contrast, Together Mode teaches away from this by intentionally eliminating the separate video cells of gallery view (with their differing backgrounds) in order to create a common static virtual scene within which all participants appear.

2. The present invention keeps individuals within their video rectangles, so that they cannot invade the personal space of other participants. In contrast Together Mode permits overlapping of participant videos, so participant images can appear to "high five" each other. Indeed, the proffered Together Mode scenes by Microsoft promote such overlapping. Together Mode's overlapping may be appropriate for spectators in the virtual stadium at a sporting event or a virtual studio audience for a comedy show. However this is "too close" for a business meeting where mere gesturing will cover the faces of "neighboring" participants and invade their "personal" space. Even though Together Mode places participants within the "same" virtual space, it allows one participant's gestures to undercut a level playing field among participants with respect to their videoconferencing participant interactions.

3. The present invention teaches how a host (or production engineer) is able to move participant videos around the virtual space grid during a performance of a play, a dance composition, or other entertainment. In contrast, Together Mode creates locations or "seats" within the scene that are static and fixed when the scene is designed. Participants cannot move around a Together Mode virtual space, or be moved by a meeting host.

4. The present invention teaches how the host can choose a subset of the participants to be mirrored and interact among themselves with gesture and gaze, leaving another set to see original unmirrored feeds. In contrast, when a participant uses Together Mode, all participants video feeds are mirrored.

5. The present invention teaches how the mirrored feeds of the interacting participants (such as performers) can be "unmirrored" (or double mirrored) so that other participants (such as an audience) will see unmirrored feeds, but arranged so that directional gaze and gesture are preserved. Together Mode mirrors individual video feeds, however any written words on clothing of a mirrored images appear backwards and unreadable. The same is true for signs held by the individual whose video feed is mirrored.

6. The present invention teaches how several subsets of participants within one videoconferencing meeting can form groups for interaction by gesture and gaze, even if they are silent. (See FIG. 7.) The value of this feature is most understandable within the context of a large meeting or event, which a group of friends attend together. For example, at an online concert, movie or play, friends who have established a mirrored grouping, can still communicate by gaze, gesture, and text chat—just as they might when attending a physical event. In contrast, Together Mode does not allow separate subsets to form groups which are displayed together with mirrored videos.

In another alternate embodiment, to help the participants interact with each other on their own displays, the software shows the video feeds of the participants in full color and the video feeds of the audience in black and white or sepia, using filter methods similar to those participants can use to enhance their own feeds in Zoom and as known to those knowledgeable in the art.

Non-host participants cannot mute others, turn off their video feeds, or spotlight them. However, in Zoom, non-host participants can "pin" the videos of others. This feature allows a participant to choose a specific meeting attendee, whose video feed will fill the participant's meeting window, as if the attendee was the speaker, and whether or not the "pinned" attendee is speaking.

Ordinarily in Zoom, a participant can pin only one video feed, while the host can pin up to nine video feeds. However, the host can permit specific other participants to multi-pin: https://support.zoom.us/hc/en-us/articles/201362743-Pinning-participants-videos.

Consider the group of participants which has self-selected to mirror and interact. In an alternative embodiment of the present invention, the system gives each participant in the group permission to pin all the video feeds of the group (in the established order)—and not view video feeds of other participants. This action occurs without affecting the video feeds sent to other participants. In another alternative embodiment, when a participant accepts the invitation to join the mirrored group, the group's ordered feed is automatically pinned for that participant—that is, the participant who joins the group automatically sees only the feeds for that group.

Other selections and arrangements of thumbnail video feeds can be made, as known to those skilled and knowledgeable in the art.

The participants participate in the videoconference of the present invention via their respective participant computers which communicate via an electronic network (e.g., the internet) to a videoconferencing system. The mirrored views of the meeting participants used in the present invention may be generated by a video processor of the videoconferencing system used in the present invention. Creating mirrored views is well-known in the art and thus is not described in further detail herein. Alternatively, the mirrored views may be created by a video processor of a participant's computer.

Figure 8:
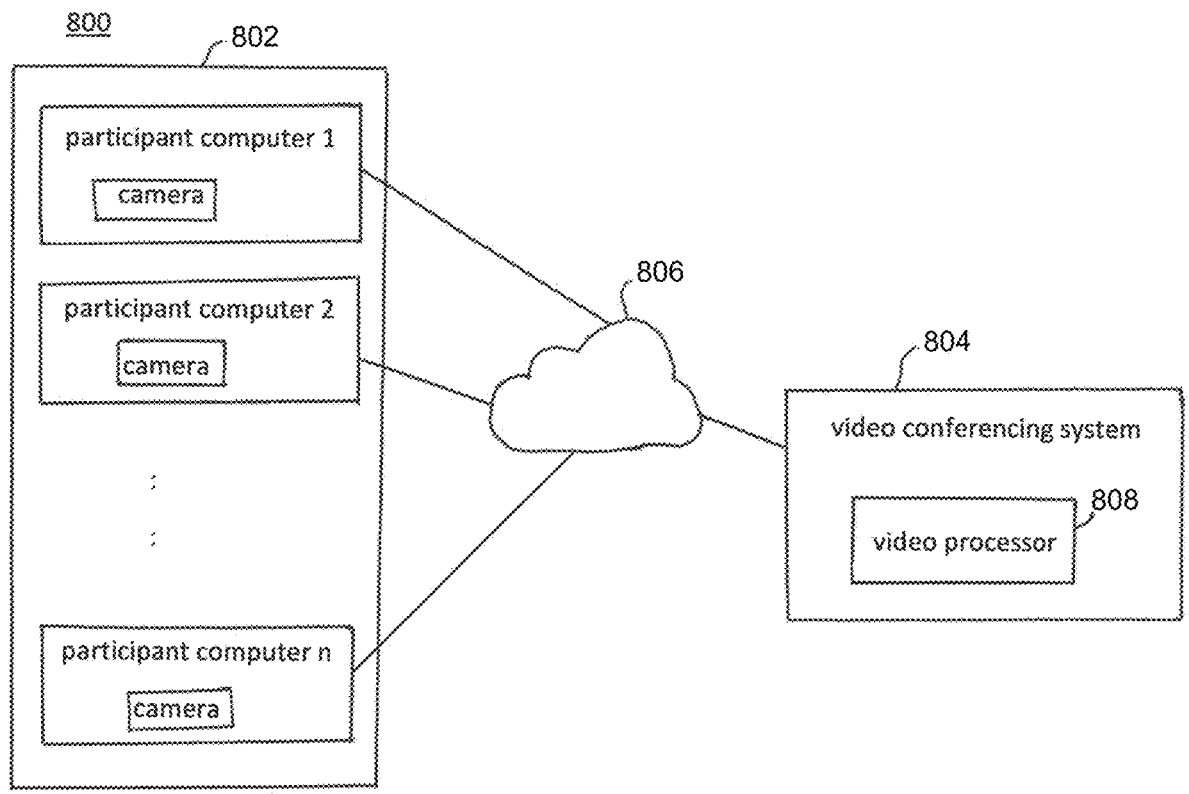
FIG. 8 is a schematic diagram of one preferred embodiment of the present invention.

FIG. 8 shows one preferred embodiment of a system (apparatus) 800 for providing a gallery view in an online meeting user interface. The system 800 includes a plurality of participant computers 802, each of which includes a camera. The participant computers 802 are in electronic communication with videoconferencing system 804 via an electronic network 806 (e.g., the internet). As discussed above, the video conferencing system 804 may include a video processor 808 to create the mirrored views.

In the embodiments above, the directly interacting participants are interchangeably referred to herein as "meeting participants," whereas the non-directly-interacting participants are interchangeably referred to herein as "additional meeting participants." In the embodiments described below, "meeting participants" refer to all meeting participants in the videoconferencing session regardless of whether they are in a breakout room or conversation group.

As is currently used in Zoom and as known to those skilled in the art, the term "filter" (as used with respect to videoconferencing platforms) includes not only changing the color tone or tint of the video and its image (e.g., changing the image from full camera-captured color to a black and white image in greyscale, or other specific color tint such as sepia like old time photos, or any other color wash or effect) but many more video effects. The term "filter" includes frames and borders which overlay a video image, stickers and decorative flourishes which occupy only a part of the screen but also overlay the image, Augmented Reality (AR) masks and animations which track the movement of the face and overlay the video image. (These masks include but are not limited to virtual hats, eyeglasses, mustaches, stickers, decals, face paint, temporary tattoos, facial hair, cartoon ears, halos, and cartoon noses.)

Different videoconferencing platforms may substitute other words or terms for "filter". For example, Snap calls such AR effects "lenses", and Snap lenses are even more varied and far reaching than detailed above. However, all such video effects, regardless of variations in terminology or methodology are considered "filters" for this disclosure.

As disclosed above, an alternative embodiment of the present invention helps participants interact when their video images are mirrored by using a visual distinction or differentiation to identify which participants images are mirrored. Examples given previously above included use of full color for video feeds, using black and white instead of color, using a sepia tinted video feed, using other filters, and using silhouettes, icons, or specially designed avatars (such as still images, drawn images, or participant initials) as a substitute for the video feed.

Currently in Zoom and some other videoconferencing platforms, and as well known by those skilled in the art, a visually distinct border is shown around the video feed of a person who is speaking. This is a different visual differentiation than that used by the present invention for distinguishing the mirrored video feeds. Nonetheless, some embodiments of the present invention use borders, though such "mirroring" borders are intended to be visually different from an "active speaker" border.

Also as disclosed above, in some embodiments, participants (rather than hosts) self-select whether to have their mirrored video feed shown to other participants. As disclosed above and below, in some embodiments, the video feeds of the meeting participants are either mirrored views or unmirrored views, and all meeting participants receive the same mirrored or unmirrored views of the meeting participants. There is an embodiment where participants can select always to be mirrored in the video session regardless of its "structure", that is, regardless of creation of, assignment to, removal from, or change of any breakout rooms or conversation groups formed during the session—at least until the participant de-selects mirroring (or selects unmirroring). The self-selected mirroring allows the meeting participants showing the mirrored views to interact with each other more fully within the online meeting, and experience the mirrored gallery view or virtual space view of each other when viewing the online meeting. (Of course, the non-mirrored participants can interact with each other, but not in a mirrored environment.)

Consider now FIG. 9A. This figure shows a participant 381 in front of a computer screen, 101, which shows a gallery view of nine video feeds of nine individuals participating in a videoconferencing session. A webcam, 103, sits above the screen. The participant shown in video feed 107 is speaking—as that participant was in previous figures including FIG. 1A, FIG. 2A, and FIG. 3B.

Participant 381 is the same participant as shown in FIG. 3E as viewing screen 101, and being videoed by webcam 103. (The mirrored video feed of participant 381 is displayed in the lower left corner of the screen in FIG. 9A as video feed 311.) The participants in the videoconference whose video feeds are shown on screen 101 are the same as the participants in FIG. 2A. Six of the video feeds are the same in both FIG. 2A and FIG. 9A, and in the same relative position on screen 101. These are 201, 203, 205, 207, 107, and 215. Three of the video feeds in both FIG. 2A and FIG. 9A are of the same participants—and in the same relative positions, but their video feeds in FIG. 9A are mirrored version of those shown in FIG. 2A. These are 309, 311, and 313. (These mirrored video feeds are also shown in the same positions in both FIG. 3A and FIG. 9A.) All participants see the same order of the video feeds (host's video order)

(This disclosure will use the number of a video feed, such as 309, to refer to both the video feed and the participant whose video feed it is.)

FIG. 9A shows an alternative embodiment of the present invention in which individual participants self-select whether their mirrored video feeds are shown to all (rather than the un-mirrored original camera-captured video feed). Participants 311, 313, and 309 have done so.

Currently (prior art) individuals may self-select various filters for the video feeds of themselves. These filters could all be different, conveying only the whimsy or artistic sensibility of the participant (e.g., one could add a palm tree sticker, another add a cowboy had, another add a frame of smiley faces). However, these filters could also be the same, either by happenstance, or by agreement. Obviously, if the participants whose video feeds are mirrored all actively selected the same filter, it is easier for them to know which video feeds are mirrored, and is easier for them to interact with each other. Of course, another participant who chooses to show a mirrored video feed might not know that convention; or an un-mirrored participant might ascertain the filter of those interacting, but not realize that self-selected mirroring is also involved.

Hence the value of an alternate embodiment of the present invention in which video feeds that are shown as mirrored to all, have a common visual distinction (i.e., they appear different or are visually distinct) which the platform designates as signifying a mirrored feed, and which the platform automatically imposes on mirrored feeds, but not other feeds.

FIG. 9A also shows an alternative embodiment of the present invention in which self-selecting to have one's video feed mirrored causes the videoconferencing platform to show a specific visual distinction or difference with respect to the video feed—which visual distinction indicates to all on that platform that mirroring is being done to that feed. In this instance FIG. 9A shows a visually recognizable border, 901, on all mirrored video feeds—but not others. (As noted above, and known to those skilled in the art, other filters can be used to show a common distinct visual differentiation, and alternative embodiments utilize them.)

The participant with video feed 107 is speaking. This is made evident to all participants by a highlighting border, 903, as currently used in videoconferencing platforms such as Zoom to indicate the active speaker. (The border was not relevant to the discussion above of FIGS. 1 through 8 (FIG. 1A, FIG. 1B, FIG. 2A, FIG. 2B, FIG. 3A, FIG. 3B, FIG. 3C, FIG. 3D, FIG. 3E, FIG. 3F, FIG. 4, FIG. 5, FIG. 6A, FIG. 6B, FIG. 7, and FIG. 8), so was not shown for ease of illustration and discussion.)

Consider now FIG. 9B. This shows the same participants a few moments later. However, three of the participants have moved their hands in these few moments, so they and their video feeds are re-numbered in FIG. 9B. Participant video feed 309 in FIG. 9A becomes 909 in FIG. 9B. Participant 381 with video feed 311 in FIG. 9A becomes participant 981 with video feed 911 in FIG. 9B. Participant video feed 313 in FIG. 9A becomes 913 in FIG. 9B. Other participants have not moved in the time period between FIG. 9A and FIG. 9B, so their video feeds are not renumbered.

In FIG. 9B, participant 107 has finished speaking and participant 909 begins speaking, suggesting that participants congratulate 101 on an excellent speech, by raising their glasses in toast. Participant 981 raises her glass towards the image of 107 on the screen, which is conveyed in her mirrored video feed 911, which also appears to raise her glass towards 107. Because use of mirroring by the present invention preserves directionality of gesture and gaze, all participants see the mirrored participants (909, 911, and 913) as toasting 107—whether or not the participants' own video feed is mirrored.

Participants choose to self-select mirroring (or self-mirror) by invoking a specially named filter in the settings interface, or by activating a specially named button or control in the videoconferencing application interface. See discussion below with respect to FIG. 11B.

Participants choose to un-mirror by again activating that control, or by activating a different control or setting, as known to those skilled it the art. (See discussion below with respect to FIG. 11B.)

The initial discussion above disclosed that other platforms, particularly ones which use proximity in a virtual space as the method of clustering participants, manage and manipulate video feeds, breakout groups, and conversation clusters—and they do so via different procedures, as known to those skilled in the art, but mirroring video feeds in these proximity and spatial based platforms produces similar effects and advantages.

Figure 10A:
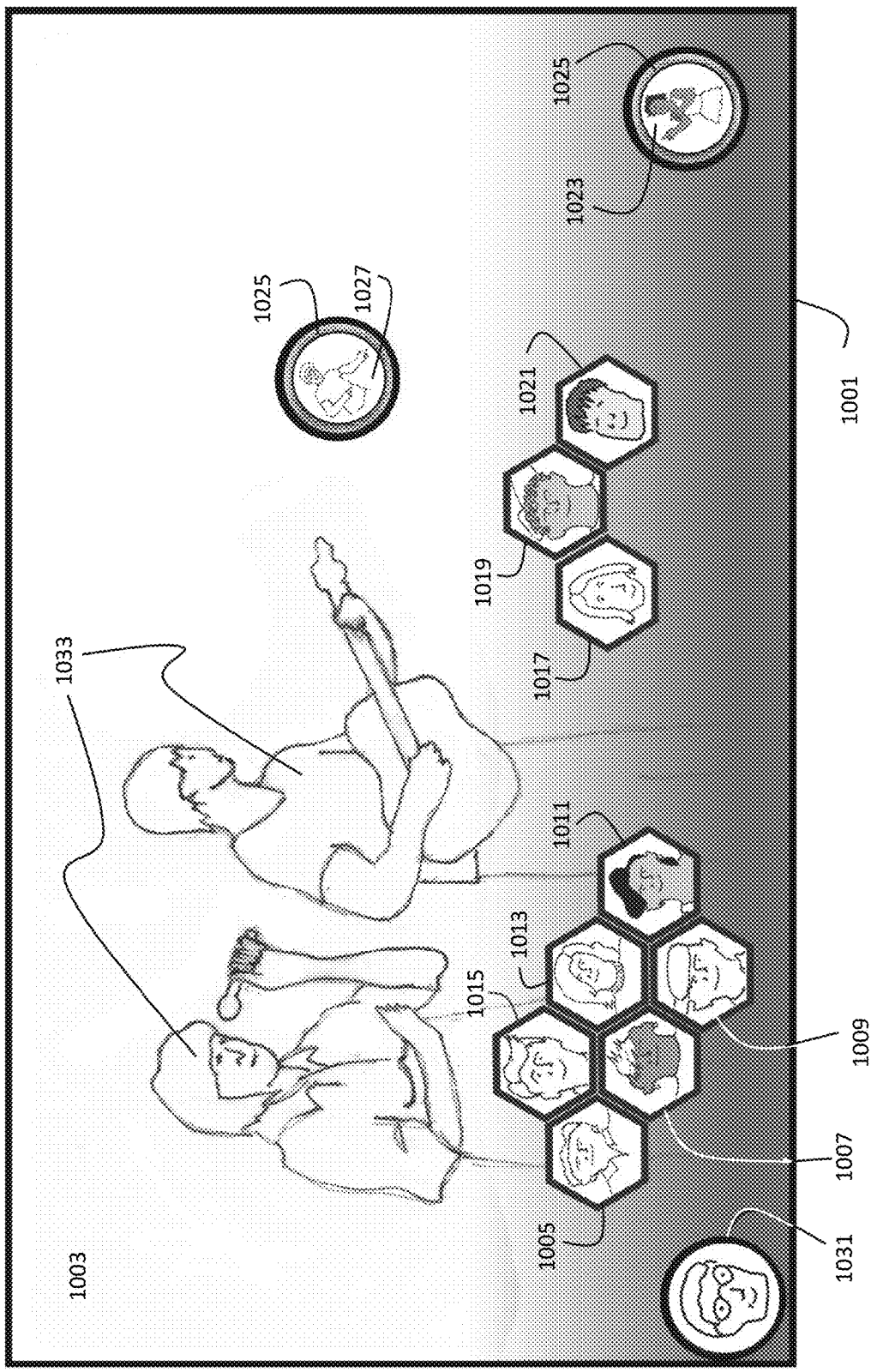
FIG. 10A is a generalized diagram of a screen shot of a videoconferencing platform which uses proximity in a virtual space to cluster participants, regulate the audio amongst them, and form conversation groups. Two of the participants have mirrored video feeds, and each is displayed with a visually distinct border.

Consider now FIG. 10A, which shows a generalized screen shot (1003) on a computer monitor (1001) of a videoconference session in a virtual space established by such a spatial videoconferencing platform. When a user joins such a session, the platform creates a participant representation or avatar of the user located in the virtual space, such as 1023, 1025, or 1031. This avatar is usually placed in the space so it is not "near" or adjacent to any other participant avatar or icon. The participant representation or avatar may be a still image, a video feed (with or without filters), an icon, user initials, generic and generalized silhouettes, or other graphic device as known to those skilled in the art.

The user can move the user's representation or avatar by various methods known to those skilled in the art, including drag and drop, a keyboard's directional arrows, clicking a mouse's cursor on a spot in the virtual space towards which the avatar moves. When the avatar comes "near" another avatar, with nearness determined by the platform's algorithm, the platform treats the two avatars (and others "near" them) as part of a breakout room or conversation group, circle, or cluster. This means that the audio from the video feeds of those participants in the same conversation circle is shared, but their audio is not shared with others not in the conversation group. (In some platforms and embodiments, the audio is shared with those outside the circle, but not at full volume.) When the platform determines that a conversation group has formed (or another participant has joined an existing conversation group), the representation of the participant(s) in the group is often changed by changing the shape of the border of their avatar(s) or the shape of the container of their video feed(s). For example, the avatar of a sole participant in Wonder, Gatherly, or Flymachine is shown as within a circle (see 1023, 1025, or 1031). However, the video feed of the participants in a conversation circle may be within a rectangle (Wonder and Gatherly) or a hexagon (Flymachine). For an exemplary illustration of the appearance of avatars (or video feeds) within a conversation circle, consider the adjacent or joined hexagons of 1005, 1007, 1009, 1011, 1013, and 1015, or the conversation circle composed of 1017, 1019, and 1021.

Figure 10B:
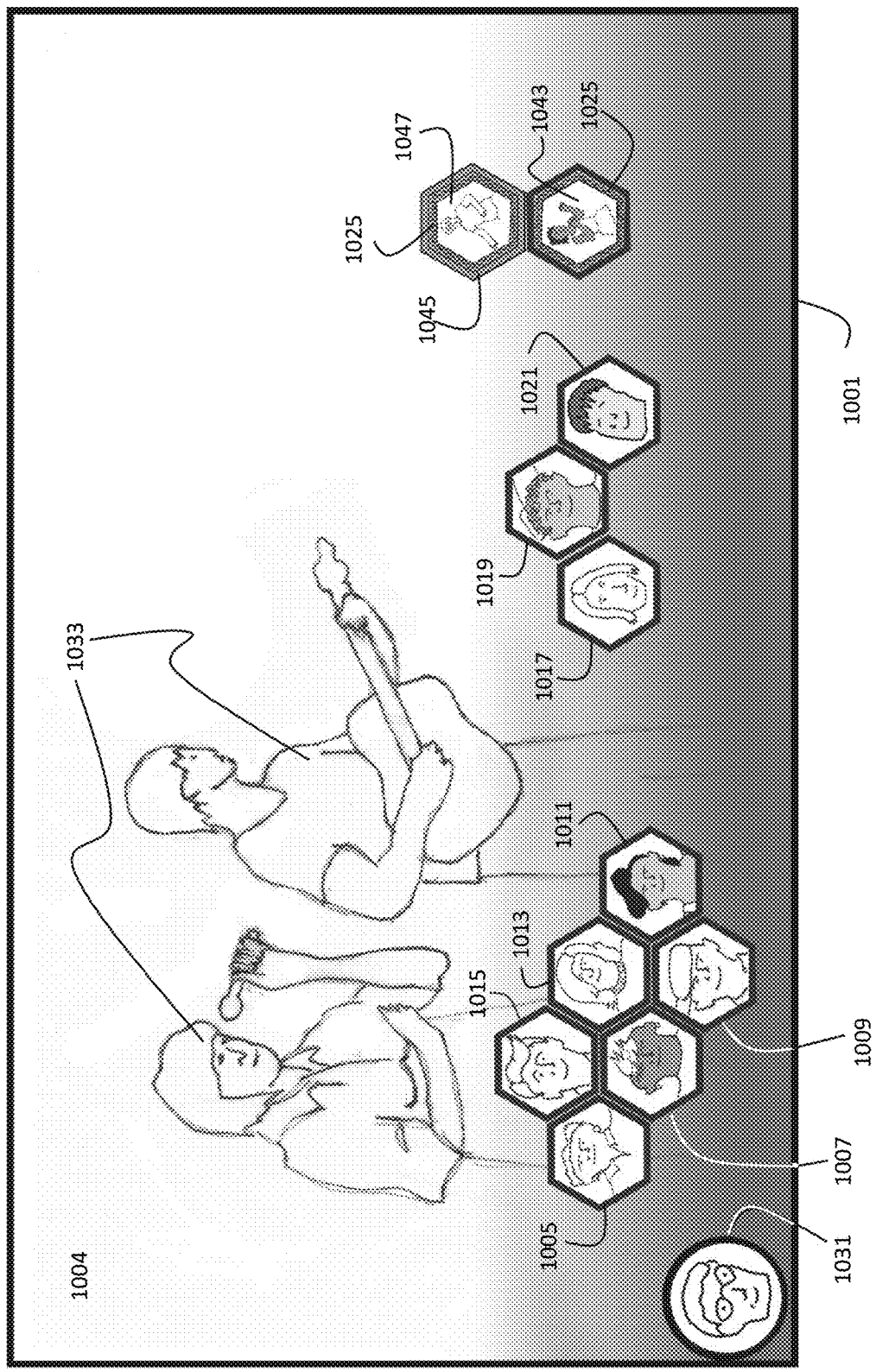
FIG. 10B is a generalized diagram of the same videoconferencing session as FIG. 10A, but a few moments later after the two participants with mirrored video feeds have joined a conversation group or circle. One of the two participants is now speaking, which is indicated by a different additional distinct border around the speaker's video feed.

This change in appearance is also shown in the transformation from FIG. 10A to FIG. 10B. The two illustrations are the same for the most part, with screenshot FIG. 10B (1004) taken a few moments after screenshot FIG. 10A (1003) during which participants 1027 and 1023 in FIG. 10A have moved their video feeds close to each other (becoming 1047 and 1043 respectively in FIG. 10B). In FIG. 10A each of the two were alone, and not in any conversation circle, but in FIG. 10B, they are both in one conversation circle together. Video feed 1023 in FIG. 10A has moved location in the virtual space and changed its shape: from circle 1023 in FIG. 10A to hexagon 1043 in FIG. 10B. In similar manner, video feed 1027 has moved and changed shape as well: from circle 1027 to hexagon 1047 in FIG. 10B. (Note also that in FIG. 10B, the video feeds of both participants 1047 and 1043 are adjoining and joined in an adjacency chain.)

This visual representation of avatars within the virtual space (as shown in FIG. 10A and FIG. 10B) will be referred to as a virtual space view. Some spatial videoconferencing platforms, such as Wonder only represent avatars as still images in the virtual space view, but then change to (or also provide) a gallery view of the video feeds of those participants who have joined a conversation group, cluster, or circle—which gallery view is only sent to the participants within that conversation group. Other videoconferencing platforms, such as Flymachine, use participant video feeds as the avatars in the virtual space view. When participant video feeds are used as avatars, the platform shows conversations groups as a chain (or linked set) of adjacent video feeds—in this way adding aspects of a gallery view to the virtual space view. See for example FIG. 10A and FIG. 10B. In these figures, more than one conversation group (gallery) is shown at the same time within the virtual space view—participants 1005, 1007, 1009, 1011, 1013, and 1015 are in one conversation group, while participants 1017, 1019, and 1021 are in another.

The terms conversation group, conversation cluster, conversation circle, and conversation chain are used interchangeable. In some platforms, a conversation group is almost identical with a breakout group, where only those in the group see each other's videos. In other platforms such as Flymachine, there are both similarities and differences. For example, in Flymachine, a participant sees videos of conversation groups (or chains) of which the participant is not a member—if those conversation groups are within the same "room", but cannot hear their audio.

It should also be noted that videoconferencing platforms which employ a virtual space may display the part of the space not occupied by participant representations or avatars as black or a single color. Alternatively, the background is a graphic (Wonder and Gatherly), a video, or a live stream (Flymachine).

FIG. 10A and FIG. 10B show an image of two musicians in the background, 1033.

Figure 11A:
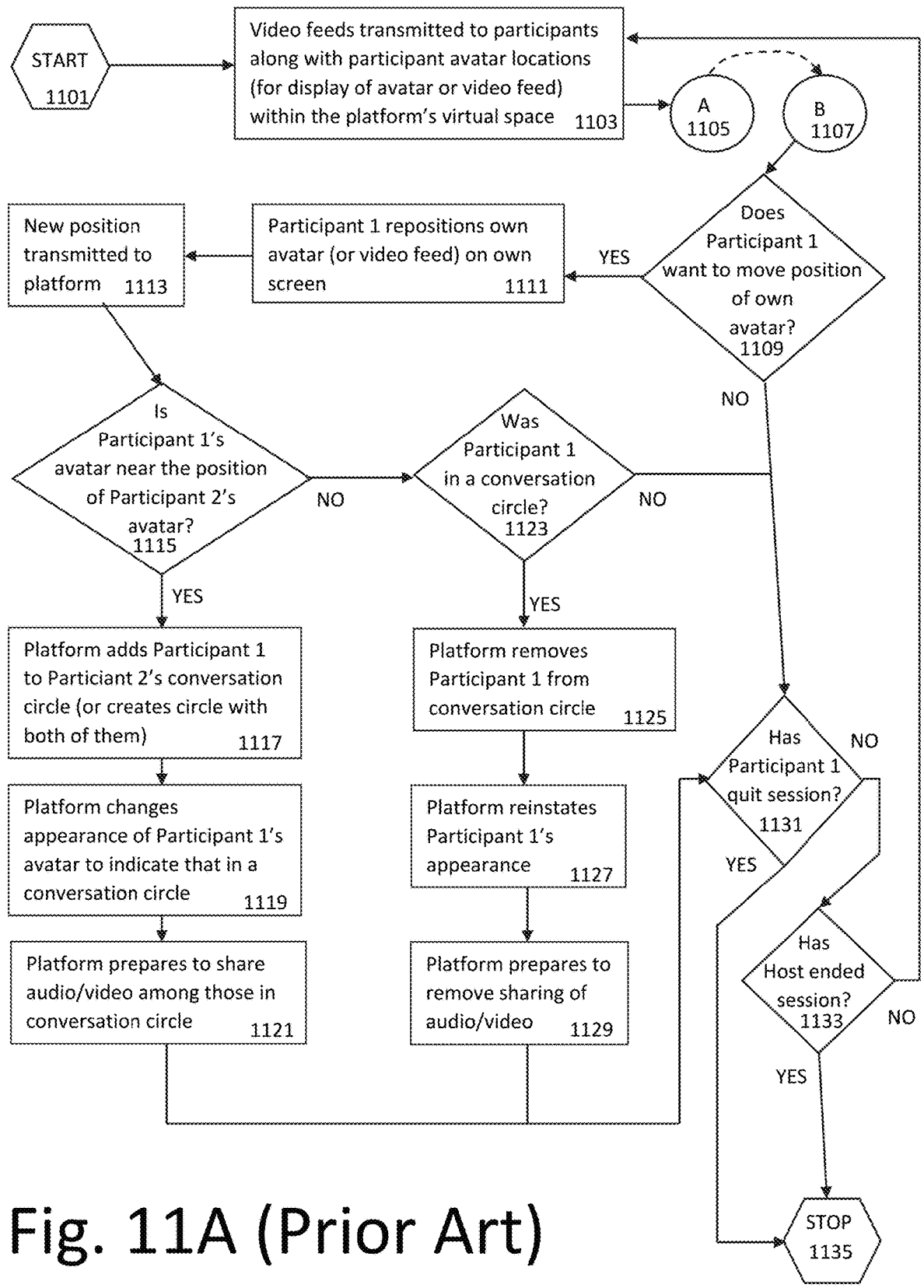
FIG. 11A is a flow chart of prior art technology for a user-participant to move the position of his avatar or video feed in the virtual space of a videoconferencing platform which uses proximity in a virtual space to cluster participants, regulate the audio amongst them, and form conversation groups.

Consider now FIG. 11A, a flow chart of prior art which provides additional detail with respect to how a user moves avatars in the virtual space. FIG. 11A should be read in conjunction with FIG. 10A and FIG. 10B, which illustrate what movement of avatars in such a virtual space looks like.

When a user, say 1027 or 1031 in FIG. 10A, enters the virtual space by joining a videoconferencing session or logging on to the videoconferencing platform, the process starts, 1101. The platform transmits the video feed of each participant to all other participants, along with the coordinate or location of the user's avatar or video feed in the virtual space, step 1103. The audio portion of each video feed is also transmitted but made available only among participants who are in the same conversation circle.

Some platforms may transmit the audio only to members of the conversation circle. Others may transmit the audio to all, but block it at the receiving end except to members of the conversation circle. Some platforms only transmit the still image or non-moving avatar of a participant to all other participants, and instead transmit the video of a participant only to members of a conversation circle which the participant has joined.

In prior art, the process moves through nodes 1105 and 1107 to decision point 1109.

FIG. 11A focuses on the process flow for one of the participants, though the system will ask this question of all participants. For ease of discussion, and without loss of generality, we called this one participant, "Participant 1".

Figure 11B:
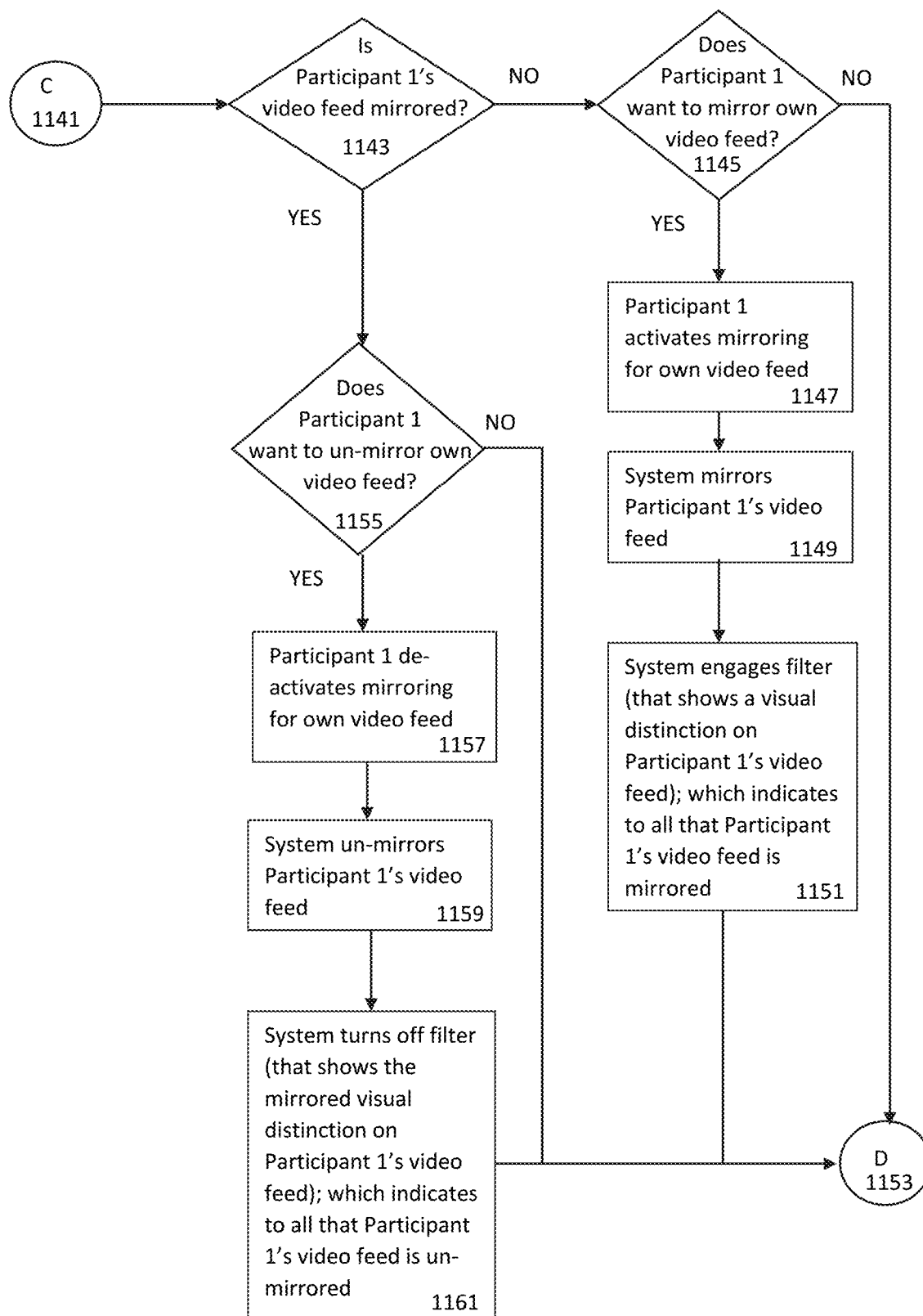
FIG. 11B is a flow chart of aspects of a preferred embodiment of the present invention which when read together with FIG. 11A, presents a flow chart of a preferred embodiment of the present invention.

The present invention inserts additional processes between these two nodes: node A (1105) and node B (1107). These additional processes are shown in FIG. 11B and are discussed further below.

Returning to decision point 1109. It queries: Does Participant 1 want to move the position of his own avatar? An example of a participant who does not want to move his or her avatar is user 1031 in FIG. 10A. In both FIG. 10A and the screenshot from a few moments later (FIG. 10B), the location of the avatar of user 1031 remains the same.

If Participant 1 does not want to move his or her avatar, the process moves to decision point 1131. Decision point 1131 asks if the user has quit the session. If so, the process stops, 1135. If not, the process moves to the next decision point, 1133: has the host ended the session? If so, the process stops, 1135. If not, the process returns to 1103, and starts over with the videoconferencing platform transmitting to participants the user video feeds, their virtual locations, and audio when appropriate (that is, audio is transmitted only to participants in conversation circles). This "starting over" in the flow chart of FIG. 11A, FIG. 11B, or other reference process concerning transmitting data (such as, but not limited to, video, audio, or positional) is also referred to as an update or updating of the videoconference data, video feeds, view, or instructions for displaying them.

Returning to step 1109, if Participant 1 does want to move his or her avatar, he or she repositions his or her own avatar (or video feed) in the virtual space (i.e., on his or her own screen) 1111. The repositioning is accomplished using methods such as those discussed above (i.e., drag and drop, pressing arrow keys, moving the cursor to a vector end point, etc.). The new position is transmitted to the platform, 1113, and the process moves to decision point 1115: is Participant 1's new position near the position of another participant? (This other participant is called Participant 2 for ease of illustration and without loss of generality)

Suppose Participant 1's new position is near Participant 2's, where "near" is a function of the algorithm of the videoconferencing platform. An example is the move of 1027 in FIG. 10A to a new position 1047 in FIG. 10B— this move places the participant (participant 1027/1047—that is, 1027 in FIG. 10A who moves and is shown as 1047 in FIG. 10B) near or adjacent to another participant 1023/1043 (that is, 1023 in FIG. 10A, who moves and is shown as 1043 in FIG. 10B).

In this case, in step 1117, the platform adds Participant 1 to Participant 2's conversation circle (if Participant 2 is already in a conversation circle). However, if Participant 2 had not been in a conversation circle, in step 1117 the platform creates a conversation circle with the two of them.

Then in step 1119, the platform changes the appearance of Participant 1's avatar (or video feed) to indicate and show to all that this participant is in a conversation circle, 1119. For example, in FIG. 10B, avatars/video feeds 1043 and 1047 are now displayed in hexagons. The platform then, in step 1121, prepares to share audio (in addition to the video) among those in the conversation circle.

Next, the system checks whether the Participant 1 has quit the session (1131) or the host has ended the session (1133), in which case the process with respect to Participant 1 stops, 1135. Otherwise, the process returns to 1103, and starts over, with the audio of the conversation circle being shared among them.

Returning to step 1115, if after Participant 1's move, his or her avatar or video feed is not near another participant's avatar, the process moves to decision point 1123. An example would be if 1047 in FIG. 10B moved back to his position (1027) in FIG. 10A.

Decision point 1123 asks if Participant 1 was in a conversation circle. This would be the case in the example given in the paragraph immediately above. Then the platform would remove Participant 1 from the conversation circle, 1125, reinstate Participant 1's appearance 1127 (in this case change the shape of the avatar border or video container from hexagon to circle as shown in 1027 of FIG. 10A), and prepare to remove sharing of audio with among members formerly in the conversation circle, 1129.

If Participant 1 had been in a two-person conversation circle, then the platform would remove both from the conversation circle (not shown), reinstate both participants' appearance (not shown) and remove audio sharing from both participants' point of view (not shown).

As before, the system then checks whether the Participant 1 has quit the session (1131) or the host has ended the session (1133), in which case the process with respect to Participant 1 stops, 1135. Otherwise, the process returns to 1103, and starts over—though the audio of the conversation circle is no longer shared among Participant 1 and the other participants formerly in the conversation circle.

Returning to step 1123, suppose that after Participant 1's move, his or her avatar or video feed is not near another participant's avatar, and Participant 1 had not been in a conversation circle. There is no need to change to Participant 1's avatar or video feed appearance, so the system does not have to take any such action. Rather, as before, the system then checks whether the Participant 1 has quit the session (1131) or the host has ended the session (1133), in which case the process with respect to Participant 1 stops, 1135. Otherwise, the process returns to 1103, and starts over.

As known to those skilled in the art, this description of prior art varies somewhat with each different platform. For example, with Flymachine, the avatar is a video feed, but other platforms such as Wonder or Gatherly only use a still image of the participant as an avatar, and only share video (as well as audio) among members of a conversation circle. For such systems, FIG. 11A is amended appropriately.

Consider now the present invention, and how it differs from prior art.

Suppose that the participants whose videos are 1023 and 1027 in FIG. 10A, had chosen (self-selected) to have their video feeds mirrored, and that the video feeds shown in 1023 and 1027 are mirrored. Consider an alternative embodiment of the invention in which mirrored video feeds are shown with a visual distinction and intentionally distinct appearance. One implementation of such a visual distinction is a distinct special recognizable border to the video feed, labeled as 1025 in FIG. 10A.

Participants might choose or self-select to be mirrored if they wished to dance with others. In FIG. 10A, consider that (as in Flymachine) there are two live musicians (1033) and their audio is sent to all participants. Both 1023 and 1027 are each dancing alone, but each might wish to find a dance partner. The other participants in FIG. 10A have not chosen mirroring. They do not appear to be dancing, and are just listening to the music of 1033, or talking to each other.

In a preferred alternative embodiment, participants can self-select for their video feeds to be shown to all as mirrored, and the system automatically shows a visual distinction between a mirrored feed and an unmirrored one. An instance of this embodiment is illustrated in FIG. 11A, this visual distinction is a special border around avatars and video feeds, labeled 1025. Such self-selection is accomplished by a participant activating a button or control on the participant's computer or display interface, thereby sending an electronic request to the videoconferencing application, system, and platform. Upon receipt of the request, the videoconferencing system creates a mirrored view of the participant's video feed, using a video processor—either at the participant's computer, in the cloud, or at the computer of anyone participating in the videoconferencing session. Likewise, a participant self-selects for his or her mirrored video feed to be shown subsequently as unmirrored to all. (As discussed below, in some embodiments, a participant can self-select mirroring and unmirroring via gesture recognition or audio and verbal command.)

Participant 1027 sees border 1025 indicating that participant 1023 is mirrored—and 1027 moves his avatar to be near 1023. The result is as in FIG. 10B where these two participants are labeled 1047 and 1043. The platform creates a conversation circle with the two of them. They can now dance together and converse. Border 1045 indicates that participant 1047 is speaking to 1043. Note that the conversation border 1045 is different than the visual distinction 1025 indicating the mirrored video feeds.

Examining the process in this preferred alternative more closely, consider that FIG. 11B, which shows a flow chart for the present invention, is now part of the flow for a videoconferencing platform based on a virtual space, as described in FIG. 11A. In this preferred alternative embodiment, every time the FIG. 11A process goes through node A (1105), instead of moving directly to node B (1107) the process moves to node C (1141) of FIG. 11B. The process in FIG. 11B works its way through to node D (1153) of FIG. 11B and returns to node B (1107) of FIG. 11A.

Focussing on FIG. 11B. After node C, 1141, the process reaches decision point 1143: is Participant 1's video feed mirrored? If not, the process moves to decision point, 1145: does Participant 1 want to mirror his own video feed? If not, the system takes no action, and the process moves to node D, 1153 and returns to FIG. 11A.

Returning to step 1145 of FIG. 11B, consider if Participant 1 does indeed want to show his own video as mirrored. Then Participant 1 activates mirroring, 1147, using a control, such as a virtual button, a hot key, a verbal directive, a voice or audio command, an accessory switch, AI gesture recognition, or another method known to those skilled in the art. The system mirrors Participant 1's video, 1149, and engages a filter that shows a visual distinction to indicate to other participants that Participant 1's video is mirrored. Then the process moves to node D, 1153 and returns to FIG. 11A.

Returning to step 1143 of FIG. 11B, consider if Participant 1's video is already mirrored. Then the process moves to decision point 1155: does Participant 1 want to un-mirror his or her video feed (or discontinue mirroring the feed)? If not, the system takes no action, and the process moves to node D, 1153 and returns to FIG. 11A.

Returning to step 1155, consider if Participant 1's video is already mirrored, but Participant 1 wants to un-mirror (that is, de-mirror, or discontinue mirroring) his or her own video feed. Then Participant 1 engages a control or switch to deactivate mirroring, 1157. In some embodiments, this means again activating the control that started mirroring. In other embodiments it means activating a different control. Then the system un-mirrors Participant 1's video feed, 1159, and turns off the filter used to show the "mirroring" visual distinction, 1161. This indicates to all participants that Participant 1's video feed is now unmirrored (1161). Then the process moves to node D, 1153, and returns to FIG. 11A.

FIG. 11B shows how self-selected mirroring is added to a spatial videoconferencing platform, when coupled with implementing a system automated visual distinction between mirrored and unmirrored video feeds. (As is known by those skilled in the art, these two features need not be coupled.) As is obvious to a person skilled in the art, a process similar to FIG. 11B can be added to videoconferencing platforms which are not based on virtual spaces, such as the gallery views of platforms illustrated in FIG. 9A and FIG. 9B.

In the disclosure above, after the discussion of FIG. 7, but before the discussion of Together Mode, an alternative embodiment was disclosed whereby when another participant moves his or her own video feed into proximity to a conversation group or chain of mirrored users, the system will ask if the new participant wishes to join the group—and if the participant agrees, the participant's video feed will become part of this mirrored group with the new participant's video feed mirrored as well.

Some spatial videoconferencing platforms have separate conversation circles within breakout rooms. One example is Flymachine. Another is Gatherly, though Gatherly does not use the term "breakout room", but rather references the analogy of a "floor" in a high-rise building.

In another alternative embodiment, a virtual room or floor is dedicated by the host or another participant to mirrored interaction among participants. (For example, consider implications for Flymachine, where any attendee can set up his or her own breakout room.) A label or visual distinction identifies the room or floor. In this embodiment, when a participant enters the room or floor, the system changes the participant's video feed to mirrored—if the participant is not already mirrored. In another alternative embodiment, the system adds a "mirroring" visual distinction to each participant's avatar or video feed when they enter the room or floor. In this way, a room or floor can be reserved for dancing, exercise, yoga, or other type of interaction which mirroring facilitates.

In an alternative embodiment the system stores the mirrored status of every participant when outside the mirrored room. Then the participant's pre-entry status can be restored or re-instated when that participant leaves the room. This occurs when a host of the videoconferencing session closes or ends the breakout room. It also occurs when the videoconferencing platform allows individual participants to leave breakout rooms on their own volition, either to return to the main session or to enter a different breakout room.

This disclosure taught how Artificial Intelligence (AI) is used in an alternative embodiment to recognize participant gestures, so that participant gestures can be used to move the location of the participant's video feed. This is illustrated in FIG. 10A and FIG. 10B, for a videoconferencing platform based on a virtual space. Participant 1027 is not only dancing, but using his index fingers to point towards the lower right corner of the screen, while participant 1023 is dancing and using her index fingers to point towards the upper left corner of the screen. In such an alternative embodiment of the present invention which embodies gesture recognition, these gestures will cause the system to move 1023 up and to the left, while moving 1027 down and to the right—or more succinctly along a directional path or vector programmed to be associated with a specific gesture. In the exemplar FIG. 10A, the direction in which the user points indicates the vector or path of movement for relocation of the user avatar or video feed in the virtual space and its space view. They will meet as in FIG. 10B (the meeting of 1043 and 1047).

It is well-known by those skilled in the art how AI algorithms are used to turn user verbal utterances and intentional audio sounds (e.g., hands clapping) into activation commands. In alternative embodiments, Artificial Intelligence (AI) is used to recognize participant gestures or audio commands so that participant gestures or audio commands can be used to self-select mirroring or unmirroring of the participant's video feed.

The processing functions performed by participant computers and the videoconferencing system are preferably implemented in software code which is executed on any suitable processor or collection of processors, whether provided in a single computer or distributed among multiple computers, within the respective participant computers and videoconferencing system. While not shown in the figures, each of the participant computers and the videoconferencing system include such processors.

The software code can be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

It should be appreciated by those skilled in the art that various modifications and variations may be made to the present invention without departing from the scope and spirit of the present invention. It is intended that the present invention include such modifications and variations as come within the scope of the present invention.

What is claimed is:

1. A method for providing a gallery view or a virtual space view in an online meeting user interface associated with a videoconferencing system, the gallery view or virtual space view displaying video feeds of meeting participants on their respective participant computers, the video feeds being camera-captured views of each of the meeting participants, the method comprising:
    (a) generating, by the videoconferencing system, instructions for a gallery view or virtual space view in the online meeting user interface using the video feeds of each of the meeting participants, wherein the generation of instructions for the gallery view or the virtual space view generates instructions for creating a visually distinct appearance for one subset of meeting participants, the generated instructions including instructions to display the gallery view or the virtual space view with the visually distinct appearance, thereby allowing views of the one subset of meeting participants to be visually distinguished from views of other meeting participants, wherein the visually distinct appearance persists regardless of whether any of the meeting participants in the subset of meeting participants are presently speaking; and
    (b) transmitting, by the videoconferencing system, via an electronic network, instructions to display the gallery view or virtual space view to all meeting participants on their respective participant computers.

2. The method of claim 1 wherein the visually distinct appearance is a full color view of each of the video feeds of the participants in the one subset of meeting participants, and the video feeds of other meeting participants are not full color.

3. The method of claim 2 wherein the video feeds of the other meeting participants which are not full color are black and white.

4. The method of claim 1 wherein the visually distinct appearance is a visually distinct border around the view of each of the video feeds of the participants in the one subset of meeting participants.

5. The method of claim 1 wherein the videoconferencing system generates and transmits instructions to create and display the gallery view.

6. The method of claim 1 wherein the videoconferencing system generates and transmits instructions to create and display the virtual space view.

7. The method of claim 1 wherein the one subset of meeting participants includes at least two meeting participants.

8. The method of claim 1 wherein the visually distinct appearance is the result of applying a filter.

9. An apparatus for providing a gallery view or a virtual space view in an online meeting user interface associated with a videoconferencing system, the gallery view or virtual space view displaying video feeds of meeting participants on their respective participant computers, the video feeds being camera-captured views of each of the meeting participants, wherein the videoconferencing system is configured to:
    (a) generate instructions for a gallery view or virtual space view in the online meeting user interface using the video feeds of each of the meeting participants, wherein the generation of instructions for the gallery view or the virtual space view generates instructions for creating a visually distinct appearance for one subset of meeting participants, the generated instructions including instructions to display the gallery view or the virtual space view with the visually distinct appearance, thereby allowing views of the one subset of meeting participants to be visually distinguished from views of other meeting participants, wherein the visually distinct appearance persists regardless of whether any of the meeting participants in the subset of meeting participants are presently speaking; and
    (b) transmit, via an electronic network, instructions to display the gallery view or virtual space view to all meeting participants on their respective participant computers.

10. The apparatus of claim 9 wherein the visually distinct appearance is a full color view of each of the video feeds of the participants in the one subset of meeting participants, and the video feeds of other meeting participants are not full color.

11. The apparatus of claim 10 wherein the video feeds of the other meeting participants which are not full color are black and white.

12. The apparatus of claim 9 wherein the visually distinct appearance is a visually distinct border around the view of each of the video feeds of the participants in the one subset of meeting participants.

13. The apparatus of claim 9 wherein the videoconferencing system generates and transmits instructions to create and display the gallery view.

14. The apparatus of claim 9 wherein the videoconferencing system generates and transmits instructions to create and display the virtual space view.

15. The apparatus of claim 9 wherein the one subset of meeting participants includes at least two meeting participants.

16. The apparatus of claim 9 wherein the visually distinct appearance is the result of applying a filter.

* * * * *